(12) United States Patent
Xia et al.

(10) Patent No.: US 12,476,870 B2
(45) Date of Patent: Nov. 18, 2025

(54) DATA COLLECTION METHOD AND DEVICE

(71) Applicant: HUAWEI TECHNOLOGIES CO.,LTD., Guangdong (CN)

(72) Inventors: Liang Xia, Shenzhen (CN); Zitao Wang, Nanjing (CN); Yulin Shi, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 17/513,841

(22) Filed: Oct. 28, 2021

(65) Prior Publication Data
US 2022/0052919 A1 Feb. 17, 2022

Related U.S. Application Data

(63) Continuation of application No. PCT/CN2020/083396, filed on Apr. 5, 2020.

(30) Foreign Application Priority Data

Apr. 29, 2019 (CN) ........................ 201910357610.X

(51) Int. Cl.
*H04L 41/08* (2022.01)
*H04L 9/32* (2006.01)
*H04L 41/0816* (2022.01)
*H04L 41/084* (2022.01)
*H04L 41/0866* (2022.01)

(52) U.S. Cl.
CPC ........ *H04L 41/0886* (2013.01); *H04L 9/3263* (2013.01); *H04L 41/0816* (2013.01); *H04L 41/0843* (2013.01); *H04L 41/0866* (2013.01)

(58) Field of Classification Search
CPC .............. H04L 9/3263; H04L 41/0816; H04L 41/0843; H04L 41/0886
See application file for complete search history.

(56) References Cited

U.S. PATENT DOCUMENTS

| | | | |
|---|---|---|---|
| 9,088,509 B1 * | 7/2015 | Sella | H04L 45/22 |
| 9,288,199 B1 * | 3/2016 | Winn | H04L 63/08 |
| 10,374,956 B1 * | 8/2019 | Tracy | H04L 41/0816 |

(Continued)

FOREIGN PATENT DOCUMENTS

| | | |
|---|---|---|
| CN | 103460215 A | 12/2013 |
| CN | 108306740 A | 7/2018 |

(Continued)

OTHER PUBLICATIONS

E. Voit et al., "Customized Subscriptions to a Publisher's Event Streams," Apr. 6, 2018. (Year: 2018).*

(Continued)

*Primary Examiner* — Andrew C Georgandellis

(57) ABSTRACT

In a data collection method for a remote attestation process, a remote attestation server delivers a subscription configuration to a network device, where the subscription configuration for subscribing to information related to remote attestation performed by the network device. The remote attestation server receives the subscription information returned by the network device based on the subscription configuration.

17 Claims, 13 Drawing Sheets

(56) References Cited

U.S. PATENT DOCUMENTS

| | | | |
|---|---|---|---|
| 2007/0118642 A1* | 5/2007 | Kumbalimutt | H04L 67/55 709/224 |
| 2008/0072329 A1 | 3/2008 | Herschaft | |
| 2010/0057849 A1 | 3/2010 | Ji | |
| 2011/0040957 A1* | 2/2011 | Berger | G06F 21/53 713/1 |
| 2012/0216244 A1* | 8/2012 | Kumar | G06F 21/57 726/1 |
| 2014/0094162 A1* | 4/2014 | Heo | H04W 74/002 455/422.1 |
| 2015/0156615 A1* | 6/2015 | Gao | H04W 4/025 455/414.3 |
| 2015/0341821 A1* | 11/2015 | Hong | H04W 28/0236 370/254 |
| 2016/0205580 A1* | 7/2016 | Pragada | H04W 36/0058 370/252 |
| 2019/0020738 A1* | 1/2019 | Paul | H04L 45/58 |
| 2019/0380017 A1* | 12/2019 | Thangarasa | H04W 24/10 |
| 2020/0042324 A1* | 2/2020 | Ayolasomyajula | G06F 9/542 |

FOREIGN PATENT DOCUMENTS

| | | |
|---|---|---|
| CN | 109691154 A | 4/2019 |
| JP | 2006072682 A | 3/2006 |
| JP | 2009534749 A | 9/2009 |
| JP | 2016157323 A | 9/2016 |
| KR | 20130091353 A | 8/2013 |
| WO | 2017178811 A1 | 10/2017 |
| WO | 2018125989 A2 | 7/2018 |
| WO | 2018136087 A1 | 7/2018 |
| WO | 2018140628 A1 | 8/2018 |

OTHER PUBLICATIONS

H. Birkholz et al., Architecture and Reference Terminology for Remote Attestation Procedures, draft-birkholz-rats-architecture-01, Network Working Group Internet-Draft, Mar. 12, 2019, total 31 pages.

H. Birkholz et al., Reference Interaction Model for Challenge-Response-based Remote Attestation, draft-birkholz-rats-reference-interaction-model-00, TBD Internet-Draft, Mar. 12, 2019, total 8 pages.

Request for Comments: 8340, M. Bjorklund et al., YANG Tree Diagrams, Internet Engineering Task Force (IETF), Mar. 2018, total 13 pages.

Request for Comments: 4949, R. Shirey, Internet Security Glossary, Version 2, Network Working Group, Aug. 2007, total 365 pages.

Notice of Allowance issued in KR10-2021-7015357, dated Jun. 29, 2023, 2 pages.

E. Voit et al., "Subscription to YANG Event Notifications draft-ietf-netconf-subscribes-notifications-22", NETCONT Internet-Draft, Jan. 23, 2019,total 78 pages, XP015130765.

Communication pursuant to Article 94(3), dated Sep. 4, 2024, 7 pages.

* cited by examiner

```
module: ietf-rats-sub-push
  augment /sn:streams/sn:stream:
    +--ro type?   identityref
  augment /sn:subscriptions:
    +--rw events
      +--rw event* [name]
        +--rw name    string
        +--rw type?   identityref
  augment /sn:subscriptions/sn:subscription:
    +--rw (rats-type)?
      +--:(tpm2-attestation-challenge)
      |  +--rw tpm2-attestation-challenge
      |     +--rw pcr-list* [id]
      |     |  +--rw id    string
      |     |  +--rw pcr
      |     |     +--rw pcr-indices*                 uint8
      |     |     +--rw (algo-registry-type)
      |     |        +--:(tcg)
      |     |        |  +--rw tcg-hash-algo-id?      uint16
      |     |        +--:(ietf)
      |     |           +--rw ietf-ni-hash-algo-id?  uint8
      |     +--rw nonce-value?                       binary
      |     +--rw (signature-identifier-type)
      |     |  +--:(TPM_ALG_ID)
      |     |  |  +--rw TPM_ALG_ID-value?            uint16
      |     |  +--:(COSE_Algorithm)
      |     |     +--rw COSE_Algorithm-value?        int32
      |     +--rw (key-identifier)?
      |        +--:(public-key)
      |        |  +--rw pub-key-id?                  binary
      |        +--:(uuid)
      |           +--rw uuid-value?                  binary
      +--:(log-retrieval)
         +--rw log-retrieval
            +--rw log-selector* [node-name]
            |  +--rw node-name              string
            |  +--ro node-physical-index?   int32
            |  +--rw (index-type)?
            |     +--:(last-entry)
            |     |  +--rw last-entry-value?    binary
            |     +--:(index)
            |     |  +--rw index-number?        uint64
            |     +--:(timestamp)
            |        +--rw timestamp?           yang:date-and-time
            +--rw log-type?              identityref
            +--rw pcr-list* [id]
            |  +--rw id    string
            |  +--rw pcr
            |     +--rw pcr-indices*                 uint8
            |     +--rw (algo-registry-type)
            |        +--:(tcg)
            |        |  +--rw tcg-hash-algo-id?      uint16
            |        +--:(ietf)
            |           +--rw ietf-ni-hash-algo-id?  uint8
            +--rw log-entry-quantity?    uint16
  augment /sn:subscriptions/sn:subscription/yp:update-trigger/yp:periodic:
    +--rw sub-rats-event*    -> /sn:subscriptions/rsp:events/event/name
  augment /sn:subscriptions/sn:subscription/yp:update-trigger/yp:on-change:
    +--rw sub-rats-event*    -> /sn:subscriptions/rsp:events/event/name
  augment /sn:establish-subscription/sn:input:
```

FIG. 6

```
notifications:
    +---n tpm2-attestation-challenge
    |   +--ro tpm2-attestation-response* [tpm_name]
    |       +--ro tpm_name                    string
    |       +--ro tpm-physical-index?         int32
    |       +--ro up-time?                    uint32
    |       +--ro node-name?                  string
    |       +--ro node-physical-index?        int32
    |       +--ro tpms-attest
    |       |   +--ro pcrdigest?                      binary
    |       |   +--ro tpms-attest-result?             binary
    |       |   +--ro tpms-attest-result-length?      uint32
    |       +--ro tpmt-signature?             binary
    +---n log-retrieval
        +--ro system-event-logs
            +--ro node-data* [node-name]
                +--ro node-name               string
                +--ro node-physical-index?    int32
                +--ro up-time?                uint32
                +--ro tpm-updated* [tpm_name]
                |   +--ro tpm_name            string
                |   +--ro tpm-physical-index? int32
                +--ro log-result
                    +--ro (log-type)?
                        +--:(bios)
                        |   +--ro bios-event-logs
                        |       +--ro bios-event-entry* [event-number]
                        |           +--ro event-number    string
                        +--:(ima)
                            +--ro ima-event-logs
                                +--ro ima-event-entry* [event-number]
                                    +--ro event-number    string
```

FIG. 9

```
augment /sn:establish-subscription/sn:input:
  +---w (rats-type)?
     +--:(tpm2-attestation-challenge)
     |  +---w tpm2-attestation-challenge
     |     +---w pcr-list* [id]
     |     |  +---w id      string
     |     |  +---w pcr
     |     |     +---w pcr-indices*                uint8
     |     |     +---w (algo-registry-type)
     |     |        +--:(tcg)
     |     |        |  +---w tcg-hash-algo-id?     uint16
     |     |        +--:(ietf)
     |     |           +---w ietf-ni-hash-algo-id? uint8
     |     +---w nonce-value?                       binary
     |     +---w (signature-identifier-type)
     |     |  +--:(TPM_ALG_ID)
     |     |  |  +---w TPM_ALG_ID-value?           uint16
     |     |  +--:(COSE_Algorithm)
     |     |     +---w COSE_Algorithm-value?       int32
     |     +---w (key-identifier)?
     |        +--:(public-key)
     |        |  +---w pub-key-id?                 binary
     |        +--:(uuid)
     |           +---w uuid-value?                 binary
     +--:(log-retrieval)
        +---w log-retrieval
           +---w log-selector* [node-name]
           |  +---w node-name             string
           |  +---w node-physical-index?  int32
           |  +---w (index-type)?
           |     +--:(last-entry)
           |     |  +---w last-entry-value?  binary
           |     +--:(index)
           |     |  +---w index-number?      uint64
           |     +--:(timestamp)
           |        +---w timestamp?         yang:date-and-time
           +---w log-type?             identityref
           +---w pcr-list* [id]
           |  +---w id      string
           |  +---w pcr
           |     +---w pcr-indices*                uint8
           |     +---w (algo-registry-type)
           |        +--:(tcg)
           |        |  +---w tcg-hash-algo-id?     uint16
           |        +--:(ietf)
           |           +---w ietf-ni-hash-algo-id? uint8
           +---w log-entry-quantity?   uint16
augment /sn:establish-subscription/sn:input/yp:update-trigger/yp:periodic:
  +--- sub-rats-event*   -> /sn:subscriptions/rsp:events/event/name
augment /sn:establish-subscription/sn:input/yp:update-trigger/yp:on-change:
  +--- sub-rats-event*   -> /sn:subscriptions/rsp:events/event/name
```

FIG. 10

```
notifications:
  +---n tpm2-attestation-challenge
  |   +--ro tpm2-attestation-response* [tpm_name]
  |       +--ro tpm_name                    string
  |       +--ro tpm-physical-index?         int32
  |       +--ro up-time?                    uint32
  |       +--ro node-name?                  string
  |       +--ro node-physical-index?        int32
  |       +--ro tpms-attest
  |       |   +--ro pcrdigest?              binary
  |       |   +--ro tpms-attest-result?     binary
  |       |   +--ro tpms-attest-result-length?  uint32
  |       +--ro tpmt-signature?             binary
  +---n log-retrieval
      +--ro system-event-logs
          +--ro node-data* [node-name]
              +--ro node-name               string
              +--ro node-physical-index?    int32
              +--ro up-time?                uint32
              +--ro tpm-updated* [tpm_name]
              |   +--ro tpm_name            string
              |   +--ro tpm-physical-index? int32
              +--ro log-result
                  +--ro (log-type)?
                      +--:(bios)
                      |   +--ro bios-event-logs
                      |       +--ro bios-event-entry* [event-number]
                      |           +--ro event-number    string
                      +--:(ima)
                          +--ro ima-event-logs
                              +--ro ima-event-entry* [event-number]
                                  +--ro event-number    string
```

FIG. 13

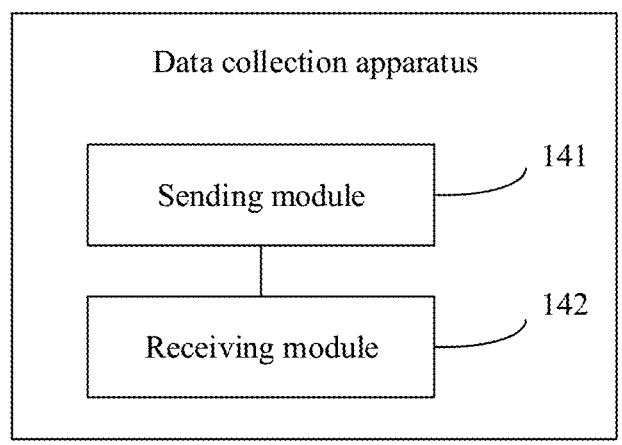

FIG. 14

DATA COLLECTION METHOD AND DEVICE

CROSS-REFERENCE TO RELATED APPLICATIONS

This application is a continuation application of Patent Application No. PCT/CN2020/083396, filed on Apr. 5, 2020, which claims priority to Chinese Patent Application No. 201910357610.X, filed on Apr. 29, 2019. The disclosures of the aforementioned applications are hereby incorporated by reference in their entirety.

TECHNICAL FIELD

This application relates to the field of computer security technologies, and in particular, to a data collection method and device.

BACKGROUND

With development of computer security technology, more and more attention is paid to research of trusted computing, and remote attestation is an important part of the trusted computing. To perform the remote attestation, a remote attestation server needs to collect data on a network device. Therefore, a data collection mode is particularly important.

Related technologies provide a polling challenge-response mechanism during data collection. In this mechanism, the remote attestation server initiates a request, and the network device replies with current trusted information and a current status based on the request.

It is clear that, in the polling challenge-response mechanism, the network device does not respond until the server initiates the request. Therefore, this data collection mode is not flexible.

SUMMARY

Embodiments of this application provide a data collection method, apparatus, and device, and a computer-readable storage medium, to resolve a problem in a related technology. Technical solutions are as follows.

According to a first aspect, a data collection method is provided. The method is applied to a remote attestation process. According to the method, a remote attestation server delivers a subscription configuration to a network device. The subscription configuration is used to subscribe to information related to remote attestation performed by the network device. The remote attestation server receives subscription information fed back by the network device based on the subscription configuration. The remote attestation server delivers the subscription configuration to the network device, and the network device may automatically feedback the subscription information based on the subscription of the remote attestation server. In this way, a data collection mode of the network device in the remote attestation is relatively flexible. In addition, because the remote attestation server does not need to deliver the subscription configuration for a plurality of times, extra message exchange is reduced, thereby improving data collection efficiency.

Optionally, the method further includes: The remote attestation server deliveries a data processing parameter to the network device, where the subscription information includes information obtained after processing is performed based on the data processing parameter. The data processing parameter is delivered to the network device in advance for use by the network device to feed back the information. In this way, a quantity of interactions is reduced, and the data collection efficiency is improved.

Optionally, the delivering a subscription configuration to the network device includes: The remote attestation server establishes a network configuration protocol session with the network device, and delivers the subscription configuration to the network device based on the network configuration protocol session. Information subscription is implemented by using a network configuration protocol, which not only has a wide application scenario, but also inherits advantages of the network configuration protocol, such as flexibility, high efficiency, proactive notification, and time validity.

According to a second aspect, a data collection method is provided. The method is applied to a remote attestation process and the method includes: A network device receives a subscription configuration delivered by a remote attestation server, where the subscription configuration is used to subscribe to information related to remote attestation performed by the network device. The network device feeds back subscription information to the remote attestation server based on the subscription configuration.

Optionally, the subscription configuration includes one or more of a data stream subscription configuration or an event subscription configuration.

Optionally, if the subscription configuration includes the data stream subscription configuration, the feeding back subscription information to the remote attestation server based on the subscription configuration includes: feeding back one or more of the following information to the remote server based on the data stream subscription configuration:
  integrity information of software at each layer of a trust chain that is recorded when the network device is booted up;
  dynamic integrity information of an operating system that is recorded when the network device runs;
  dynamic integrity information of software that is recorded when the network device runs;
  an identity certificate related to the network device; or
  a remote attestation certificate related to the network device.

Optionally, if the subscription configuration includes the event subscription configuration, the feeding back subscription information to the remote attestation server based on the subscription configuration includes feeding back, to the remote attestation server based on the event subscription configuration, information related to one or more of the following triggered events: a device boot event, a device upgrade event, a specific mode attack event, a master/slave switchover event, a board insertion/removal/switchover event, and a certificate life cycle event.

Optionally, the subscription configuration further includes a subscription mode, the subscription mode is used to indicate a mode of feeding back the subscription information, and the subscription mode includes one or a combination of a periodic feedback based subscription mode and an event-triggered feedback based subscription mode; and the feeding back the subscription information to the remote attestation server based on the subscription configuration includes:
  feeding back the subscription information to the remote attestation server based on the subscription mode included in the subscription configuration.

Optionally, the foregoing different types of information correspond to different subscription modes.

Optionally, the foregoing subscription configuration further includes a filter configuration, and the subscription information includes information obtained after filtering is performed based on the filter configuration.

Optionally, the method further includes: receiving a data processing parameter delivered by the remote attestation server, where the subscription information includes information obtained after processing is performed based on the data processing parameter.

Optionally, the receiving a subscription configuration delivered by the remote attestation server includes: establishing a network configuration protocol session with the remote attestation server, and receiving, based on the network configuration protocol session, the subscription configuration delivered by the remote attestation server.

According to a third aspect, a data collection apparatus is provided. The apparatus is used in a remote attestation process, and the apparatus includes: a sending module, configured to deliver a subscription configuration to a network device, where the subscription configuration is used to subscribe to information related to remote attestation performed by the network device;

and a receiving module, configured to receive subscription information fed back by the network device based on the subscription configuration.

Optionally, the sending module is further configured to deliver a data processing parameter to the network device, where the subscription information includes information obtained after processing is performed based on the data processing parameter.

Optionally, the sending module is configured to: establish a network configuration protocol session with the network device, and deliver the subscription configuration to the network device based on the network configuration protocol session.

According to a fourth aspect, a data collection apparatus is provided. The apparatus is used in a remote attestation process, and the apparatus includes: a receiving module, configured to receive a subscription configuration delivered by a remote attestation server, where the subscription configuration is used to subscribe to information related to remote attestation performed by the network device; and a sending module, configured to feedback subscription information to the remote attestation server based on the subscription configuration.

Optionally, if the subscription configuration includes a data stream subscription configuration, the sending module is configured to feedback one or more of the following information to the remote server based on the data stream subscription configuration:

integrity information of software at each layer of a trust chain that is recorded when the network device is booted up;
dynamic integrity information of an operating system that is recorded when the network device runs;
dynamic integrity information of software that is recorded when the network device runs;
an identity certificate related to the network device; or
a remote attestation certificate related to the network device.

Optionally, if the subscription configuration includes the event subscription configuration, the sending module is configured to feedback, to the remote server based on the event subscription configuration, information related to one or more of the following triggered events: a device boot event, a device upgrade event, a specific mode attack event, a master/slave switchover event, a board insertion/removal/switchover event, or a certificate life cycle event.

Optionally, the subscription configuration further includes a subscription mode, the subscription mode is used to indicate a mode of feeding back the subscription information, and the subscription mode includes one or a combination of a periodic feedback based subscription mode and an event-triggered feedback based subscription mode; and the sending module is configured to feed back the subscription information to the remote attestation server based on the subscription mode included in the subscription configuration.

Optionally, the receiving module is further configured to receive a data processing parameter delivered by the remote attestation server, and the subscription information fed back by the sending module includes information obtained after processing is performed based on the data processing parameter.

Optionally, the receiving module is configured to: establish a network configuration protocol session with the remote attestation server, and receive, based on the network configuration protocol session, the subscription configuration delivered by the remote attestation server.

According to a fifth aspect, a data collection device is provided. The device includes a memory and a processor. The memory stores at least one instruction, and the at least one instruction is loaded and executed by the processor, to implement the method in any possible implementation of the first aspect or the second aspect of this application.

According to a sixth aspect, a communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method in any possible implementation of the first aspect or the second aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, such as a read-only memory (read only memory, ROM). The memory and the processor may be integrated into one chip, or may be disposed in different chips. A type of the memory and a mode in which the memory and the processor are disposed are not limited in an embodiment of this application.

According to a seventh aspect, a communications system is provided. The system includes the apparatus in the third aspect or any possible implementation of the third aspect, and the apparatus in the fourth aspect or any possible implementation of the fourth aspect.

According to an eighth aspect, a computer program (product) is provided. The computer program (product) includes computer program code; and when the computer program code is run by a computer, the computer is enabled to perform the method in any possible implementation of the first aspect or the second aspect.

According to a ninth aspect, a readable storage medium is provided. The readable storage medium stores a program or instructions. When the program or the instructions is/are run on a computer, the method in any possible implementation of the first aspect or the second aspect is performed.

According to a tenth aspect, a chip is provided, including a processor. The processor is configured to invoke, from a memory, and run instructions stored in the memory, so that a communications device on which the chip is installed performs the method in any possible implementation of the first aspect or the second aspect.

According to an eleventh aspect, another chip is provided, including an input interface, an output interface, a processor, and a memory. The input interface, the output interface, the processor, and the memory are connected to each other through an internal connection channel. The processor is configured to execute code in the memory; and when the code is executed, the processor is configured to perform the method in any possible implementation of the first aspect or the second aspect.

According to the technical solutions in the embodiments of this application, the remote attestation server delivers the subscription configuration to the network device, and the network device can automatically feedback the subscription information based on the subscription configuration, so that the data collection mode in the remote attestation is more flexible and timely, thereby reducing a security risk. In addition, because the remote attestation server does not need to deliver the subscription configuration for the plurality of times, extra message exchange is reduced, thereby improving data collection efficiency.

BRIEF DESCRIPTION OF DRAWINGS

FIG. 6 is a schematic diagram of a tree structure of a configuration subscription data model according to an embodiment of this application;

FIG. 9 is a schematic diagram of a tree structure of a dynamic subscription data model according to an embodiment of this application;

FIG. 10 is a schematic diagram of a tree structure of a dynamic subscription data model according to an embodiment of this application;

FIG. 13 is a schematic diagram of a tree structure of a dynamic subscription data model according to an embodiment of this application;

FIG. 14 is a schematic structural diagram of a data collection apparatus according to an embodiment of this application;

DESCRIPTION OF EMBODIMENTS

Terms used in implementations of this application are merely used to explain embodiments of this application, but are not intended to limit this application.

In a trusted computing system, to establish a trusted network system, a root of trust (RoT) is first needed, and a chain of trust needs to be established. In this way, each module of the network system is trusted. Then, trust of the entire network system can be established. This shows that the root of trust needs to be a component that can be trusted. Because it may be generally considered that a trusted platform module (TPM) and a basic input/output system (BIOS) are absolutely trusted, the root of trust may exist in a TPM and a BIOS of each network device.

A trusted network device includes three trusted roots: a root of trust for measurement (RTM), a root of trust for storage (RTS), and a root of trust for reporting (RTR). The RTM is used to complete integrity measurement. The integrity measurement is usually completed by using a computing engine controlled by a core root of trust for measurement (CRTM). The CRTM includes execution code used when the network device executes the RTM, and the CRTM is generally stored in the BIOS. The RTM is also an origin of trust transfer. The RTS is an engine that maintains an integrity digest value and a digest sequence, and the RTS generally includes an engine for encrypting stored information and an encryption key. The RTR is a computing engine that can reliably report data held by the RTS. This reliability is generally ensured by a signature.

Figure 1A:
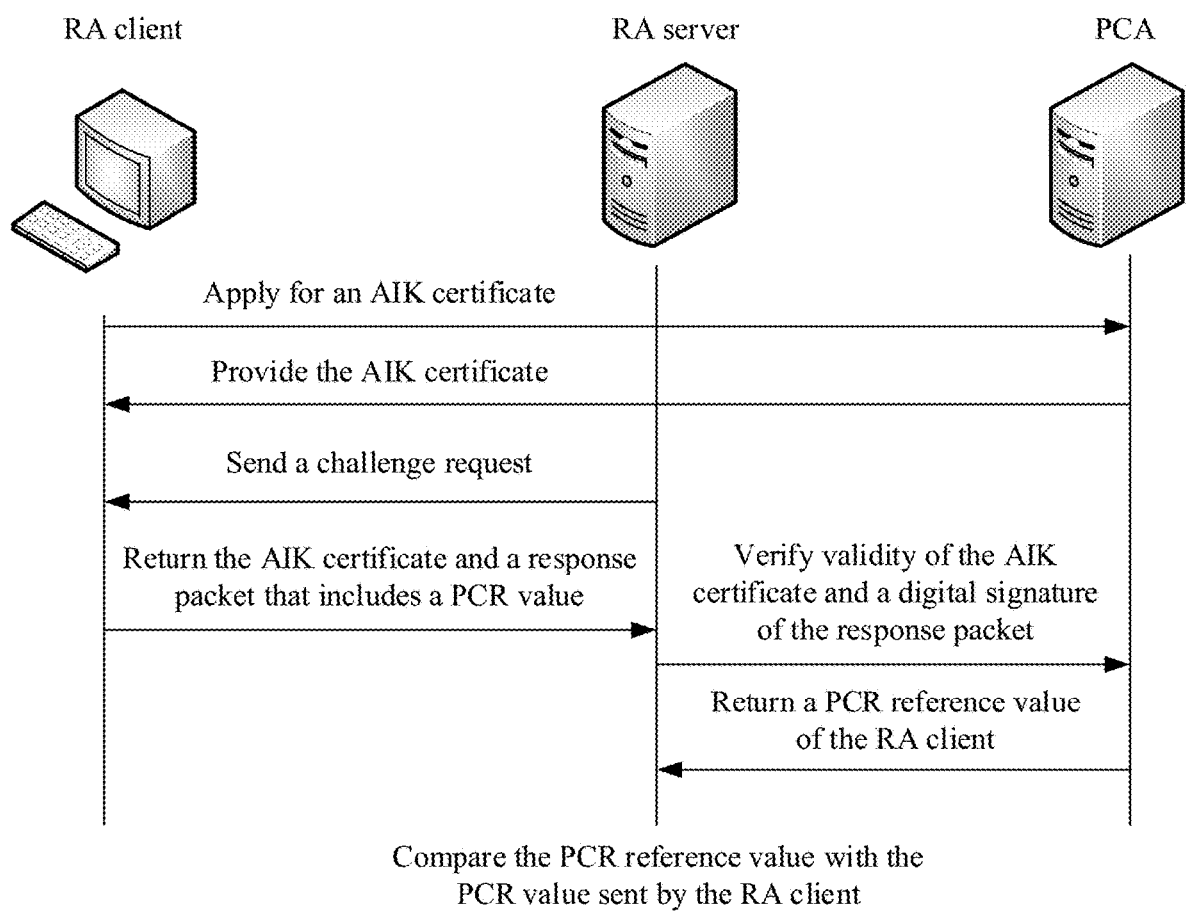
FIG. 1A is a schematic diagram of a remote attestation process according to an embodiment of this application.

Remote attestation (RA) is one of technologies in an overall trusted computing solution, and the RA is used to determine a trusted status of a trusted server. As shown in FIG. 1A, a remote attestation system includes an RA server, an RA client, and a privacy certificate authority (PCA). The RA server stores a reference value of a platform configuration register (PCR) of the RA client, is responsible for receiving a PCR value sent by the RA client, and provides a trusted status of the RA client. The RA client is a device that has a TPM and supports a trusted boot function. The RA client applies to the PCA for and obtains an attestation identity key (AIK) certificate allocated by the PCA. In some scenarios, the RA server initiates remote attestation on the RA client. The RA server sends a challenge request to the RA client. The RA client collects a PCR value, uses an AIK private key signature, and sends, to the RA server, the AIK certificate and a PCR value that is obtained after the AIK private key signature is used. The RA server verifies, to the PCA, validity of the AIK certificate sent from the RA client. The PCA returns, to the RA server, a PCR reference value corresponding to the RA client. The RA server compares, with the PCR reference value of the RA client, the PCR value sent by the RA client, and determines a trusted status of the RA client based on a comparison result. In other words, the RA server determines whether the RA client is trusted.

Figure 1B:
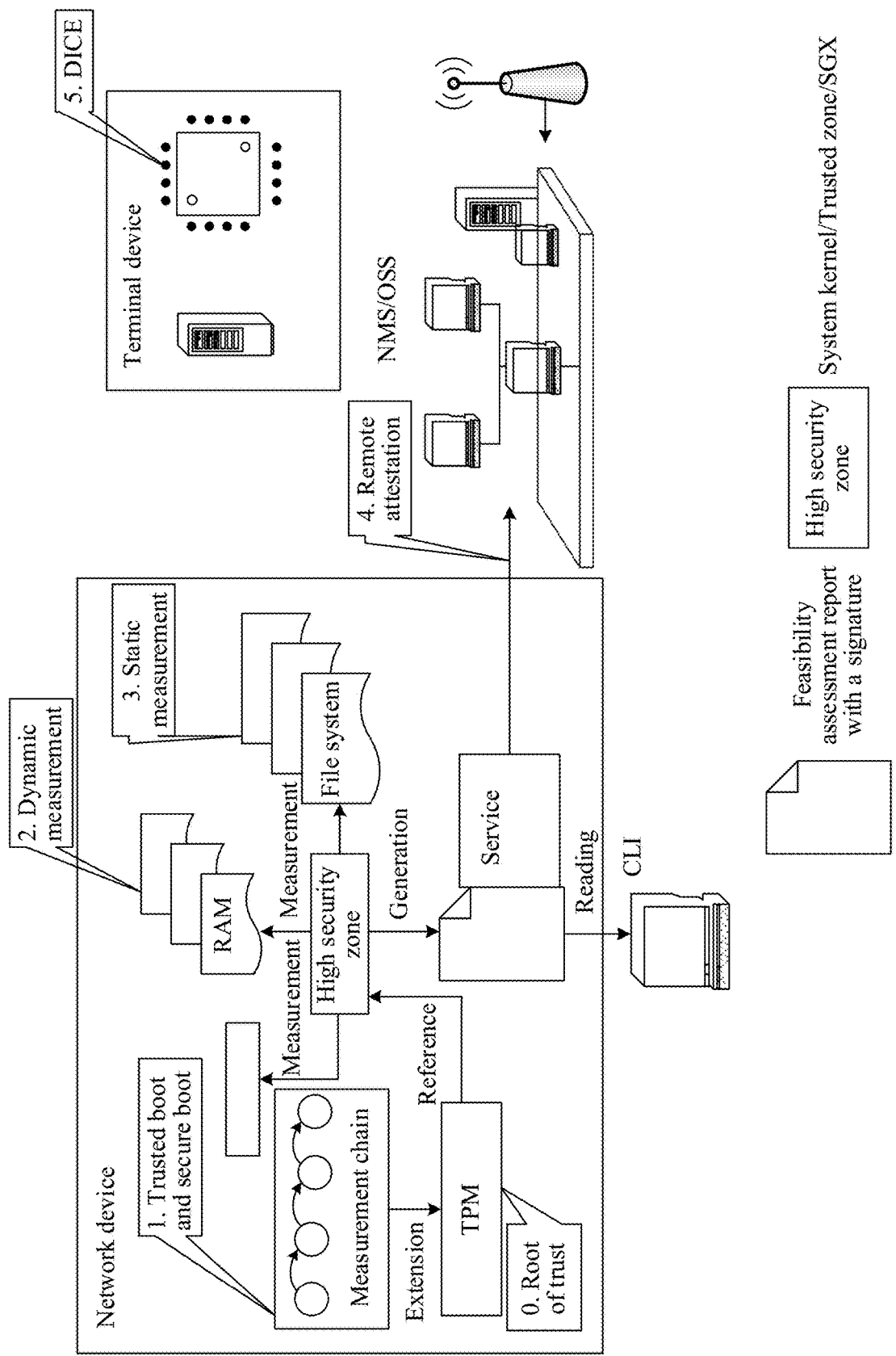
FIG. 1B is a schematic diagram of an implementation environment according to an embodiment of this application.

In an implementation environment shown in FIG. 1B, that a trusted root proposed by a trusted computing group (TCG) exists in a TPM is used as an example. A network management system (NMS) and/or an operations support system (OSS) are/is used as an RA server and/or RA servers, a network device functions as an RA client, and the network device includes a TPM. In an entire process from powering on the network device to booting up a BIOS of the network device, and loading a grand unified bootloader (GRUB) on the network device and a system kernel of the network device, the NMS/OSS needs to perform remote attestation in each process, to establish a trust chain level by level. The network device stores, in a PCR of the TPM, measurement values such as a dynamic measurement value and a static measurement value that are obtained through measurement. A remote attestation module of the network device sends these measurement values to the NMS/OSS that functions as the RA server. The NMS/OSS can calculate and obtain a current status of the network device based on a PCR value and a measurement log, and then compare the current status with an expected value to determine reliability of the network device. A high security zone in FIG. 1B may include, for example, a system kernel, a trusted zone, or intel software guard extensions (SGX). A terminal in FIG. 1B has a device identity composition engine (DICE).

Figure 2:
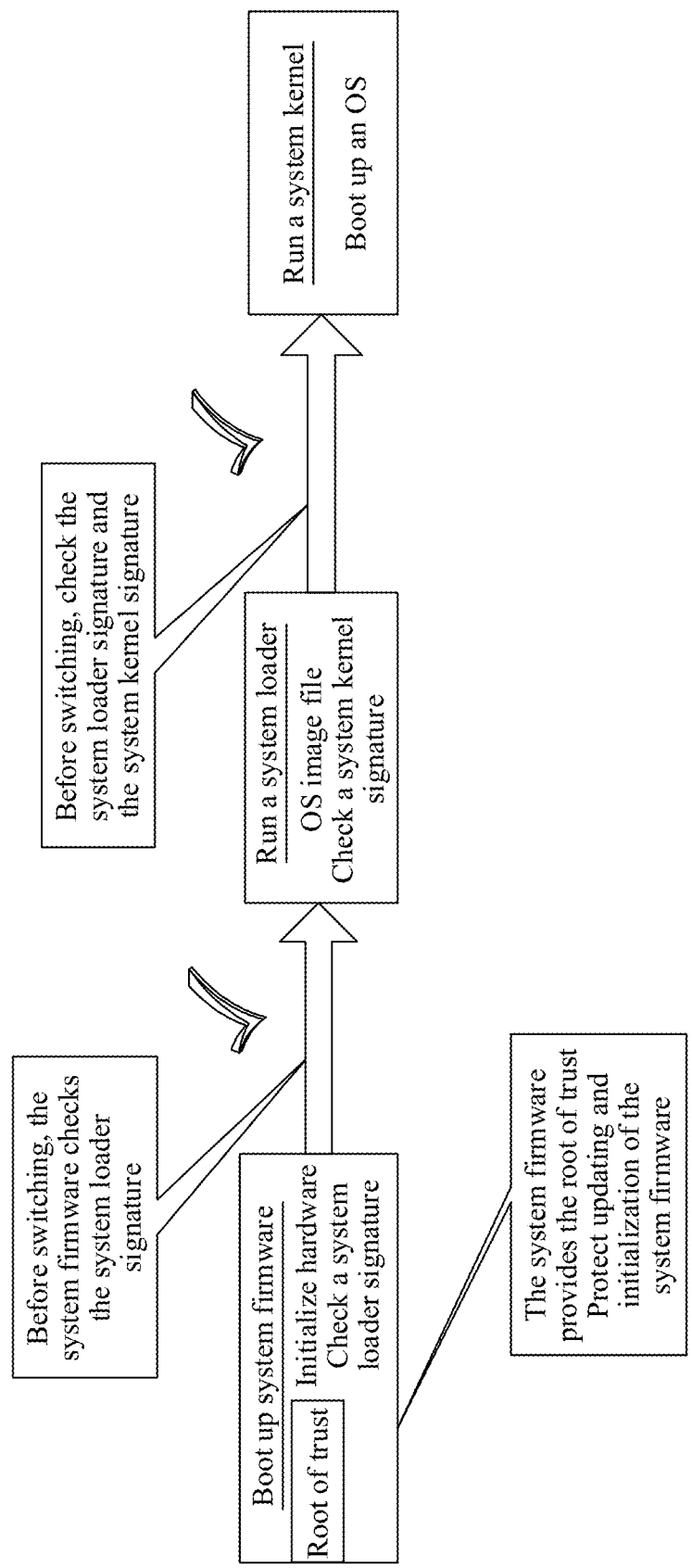
FIG. 2 is a schematic diagram of a boot process according to an embodiment of this application.

Security of the network device strongly depends on integrity of software running on the device. A trust chain model is usually used to ensure software integrity. During a boot phase, a next phase is checked before each phase is executed. As shown in FIG. 2, a root of trust (RoT) needs to be absolutely secure. During a device boot process, system firmware initializes an entire hardware system and checks a system loader to be run in a next phase. In other words, an HASH signature comparison of the system loader to be run in the next phase is performed. If a measurement value of the system loader matches a reference value of the system loader, the system loader is booted up and the system loader checks a system kernel to be run in a next phase. If a measurement value of the system kernel matches a reference value of the system kernel, the system kernel is booted up. The foregoing check process to boot process are repeated until all boot processes are completed. Boot includes secure boot and trusted boot.

The secure boot is a part (sub-rule) of a unified extensible firmware interface (UEFI). The two have a relationship between a part and a whole. The UEFI is a specification that defines a type of interface in detail. The type of interface is used for an operating system to automatically load from a pre-boot operating environment to an operating system. An extensible firmware interface (EFI) is a recommended specification proposed by Intel® for a firmware architecture, an interface, and a service of a personal computer (PC). A main function of the EFI is to provide a set of consistent and correctly specified boot services on all platforms before the operating system (OS) is loaded (boots). The secure boot uses a key to prevent malware intrusion. The UEFI specifies that some reliable public keys can be built in a mainboard before delivery. Then, any operating system or hardware driver program that needs to be loaded on this mainboard need to be authenticated by the public keys. In other words, the software needs to be signed with corresponding private keys. Otherwise, the mainboard refuses to load the software. Because malware cannot be authenticated successfully, it is impossible for the malware to infect the BOOT.

The trusted boot includes the following: During a device system boot process, a TPM of a device records a key system status of the device. After a device system is booted up, the device sends a report to a remote server for remote attestation and authentication. A user determines whether a status of an entire system environment is trusted based on results of the remote attestation and authentication. In some embodiments of this application, a remote attestation function module of the device sends a report to the remote server for remote attestation and authentication. In some embodiments of this application, a network management system or a network controller may determine, according to a preconfigured policy or a policy obtained in a specific mode and based on the results of remote attestation and authentication, whether the status of the entire system environment is trusted. For example, whether to allow a device to access, or whether to allow a device to carry a service may be determined by the network management system or the network controller according to the preconfigured policy or the policy obtained and based on the results of remote attestation and authentication.

Figure 3:
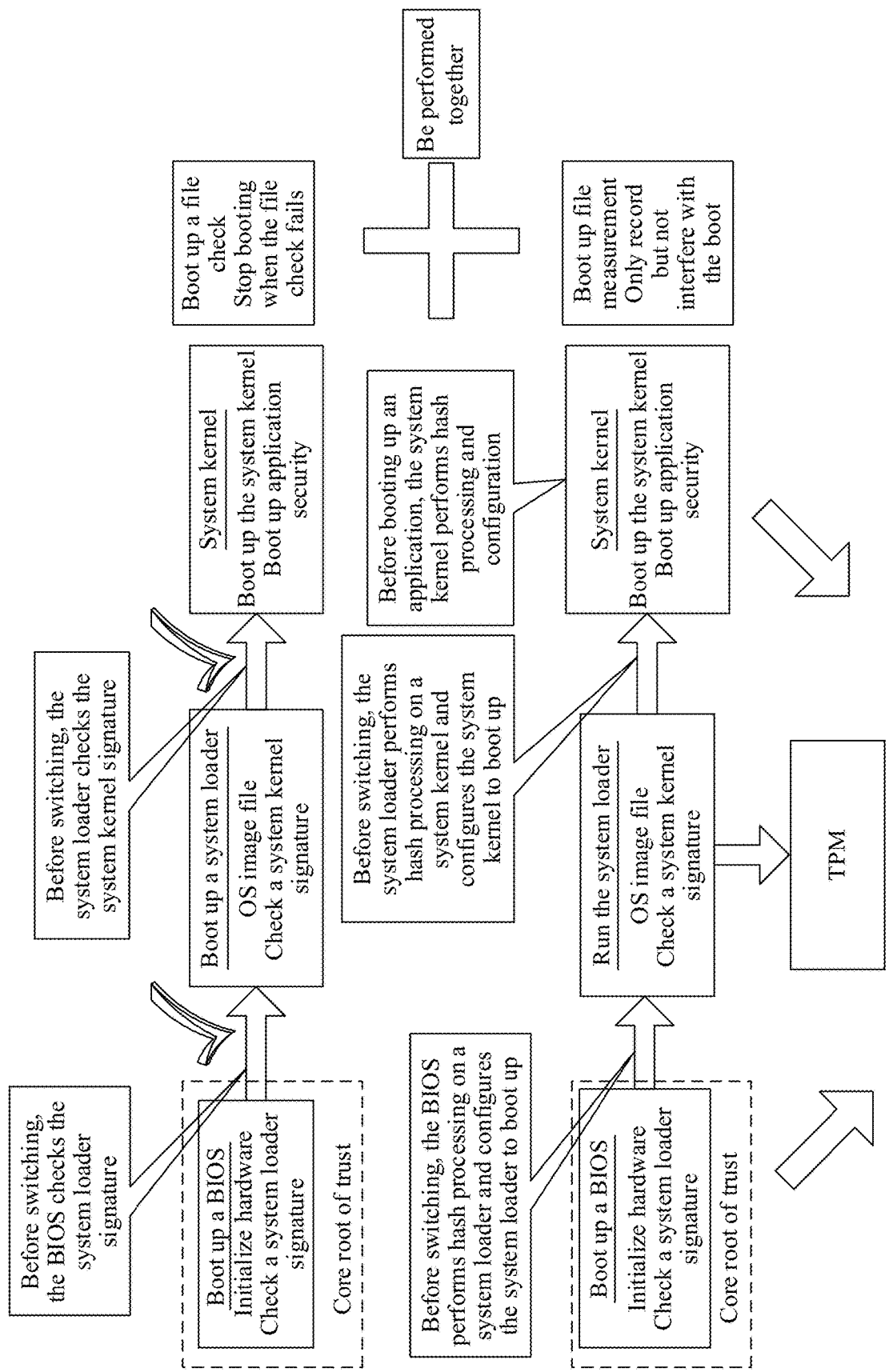
FIG. 3 is a schematic diagram of a boot process according to an embodiment of this application.

As shown in FIG. 3, booting up a file check and booting up a file measurement may be performed together. If the file check fails, boot is stopped; however, in the file measurement, only a measurement value of a boot process or a measurement value of information related to a boot process is recorded, and the file measurement does not interfere with the boot. As shown in FIG. 3, when the file check is booted up, system firmware initializes an entire hardware system, and checks a system loader to be run in a next phase. In other words, an HASH signature comparison of the system loader to be run in the next phase is performed. If a measurement value of the system loader does not match a reference value of the system loader, the boot of the system loader is stopped. If the measurement value of the system loader matches the reference value of the system loader, the system loader is booted up, and the system loader checks a system kernel to be run in a next phase. If a measurement value of the system kernel does not match a reference value of the system kernel, boot of the system kernel is stopped. If the measurement value of the system kernel matches the reference value of the system kernel, the system kernel is booted up. As shown in FIG. 3, when the file measurement is booted up, the system loader and the system kernel are also checked. However, the check does not interfere with the boot of the system loader and the boot of the system kernel, and only the measurement value of the boot process or the measurement value of the information related to the boot process is recorded in a TPM.

Figure 4:
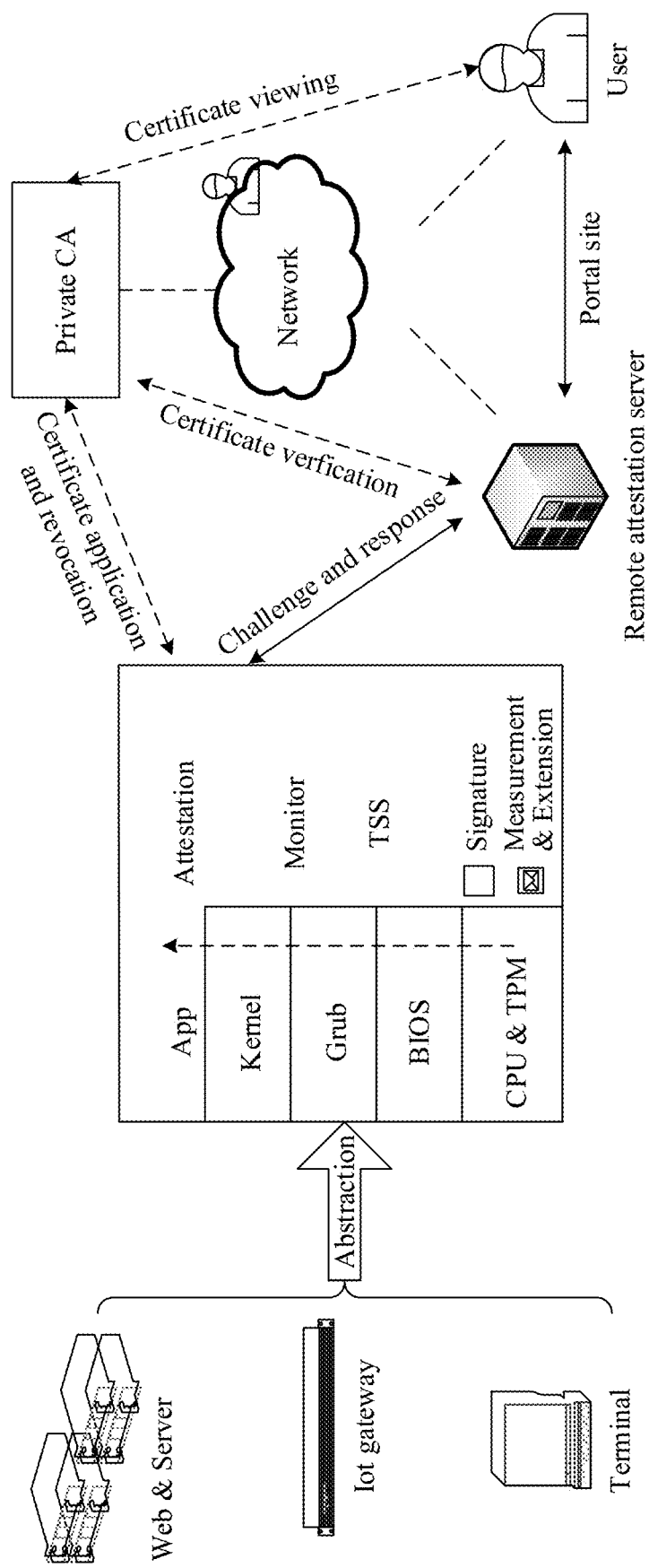
FIG. 4 is a schematic diagram of a remote attestation process according to an embodiment of this application.

Further, as shown in FIG. 4, a remote attestation server may collect, by using a network, a security attribute of a network device or a node that is sent by the network device or the node by using a specific format and an interaction process, then securely send the security attribute to the remote attestation server by using a challenge-response interaction mechanism, and perform verification according to a specific policy, to finally prove whether the device is trusted. In addition, to ensure security of the device and communication during an entire remote attestation protocol interaction process, certificate mechanisms such as certificate application and revocation need to be deployed in advance, to support necessary operations such as certificate verification and viewing during the protocol interaction process. The network device or node may be a server, an internet of things (IoT) gateway, or a terminal. The security attribute of the network device or the node includes a software and hardware integrity value, configuration information, a node status, and the like. The network device or the node may calculate and record an integrity value from a central processing unit (CPU) & TPM, to a BIOS, a Grub, a system kernel, and finally to a trust chain of an application (App). As shown in FIG. 4, trusted mobile, remote attestation, and an end-to-end trusted execution environment of a device layer, a communication layer, and a management layer can be implemented on a terminal, a gateway, and a cloud terminal.

In the foregoing remote attestation process, a data collection mode is implemented by using the challenge-response interaction mechanism. In this mode, the remote attestation server needs to first send a request to the network device, and then the network device feeds back data such as a security attribute of the network device to the remote attestation server. Consequently, this data collection mode is not flexible and is not timely, resulting in a security risk to some extent. In addition, because the server needs to initiate the request, extra message exchange occurs and efficiency is low.

In view of this, an embodiment of this application provides a data collection method applied to the remote attestation process. In the method, an example in which data is collected based on a subscription/publishment and push mechanism of a network configuration protocol (NETCONF) is used. The NETCONF is a network configuration protocol used in a network configuration management tool. The NETCONF provides a mechanism for installing, querying, reading, writing, and deleting a configuration file of the network device. Compared with a command line interface (CLI) and a simple network management protocol (SNMP), the NETCONF is more flexible and scalable. In addition, the NETCONF provides, based on a remote procedure call (RPC) layer, installation, operation, and deletion mechanisms for network device configuration by using an extensible markup language (XML) data format.

The NETCONF protocol is divided into the following four layers.

A content layer represents a set of managed objects.

An operation layer defines a series of basic primitive operation sets used in the RPC. These operations constitute basic capabilities of the NETCONF.

The RPC layer provides a simple and transport-protocol-independent mechanism for encoding an RPC module.

A communications protocol layer: Different from the SNMP that uses a connectionless user datagram protocol (UDP) as a transmission protocol, the NETCONF is connection-oriented and requires a permanent connection between communication ports. In addition, this connection needs to provide reliable and sequential data transmission. Currently, a secure shell protocol (SSH), a transport layer security (TLS) protocol, and the like are supported.

In addition, in the method provided in this embodiment of this application, Yang push is used to provide a standard mechanism, so that any data described by using a Yang model in a system can be subscribed to. After a subscription path and a subscription mode are specified, when a periodic feedback based subscription mode is selected, the system pushes specified data to a subscriber after a specified time period expires. When an on change mode is selected (namely, an event-triggered feedback based subscription mode), the system pushes the data to the subscriber when subscribed data changes.

Figure 5:
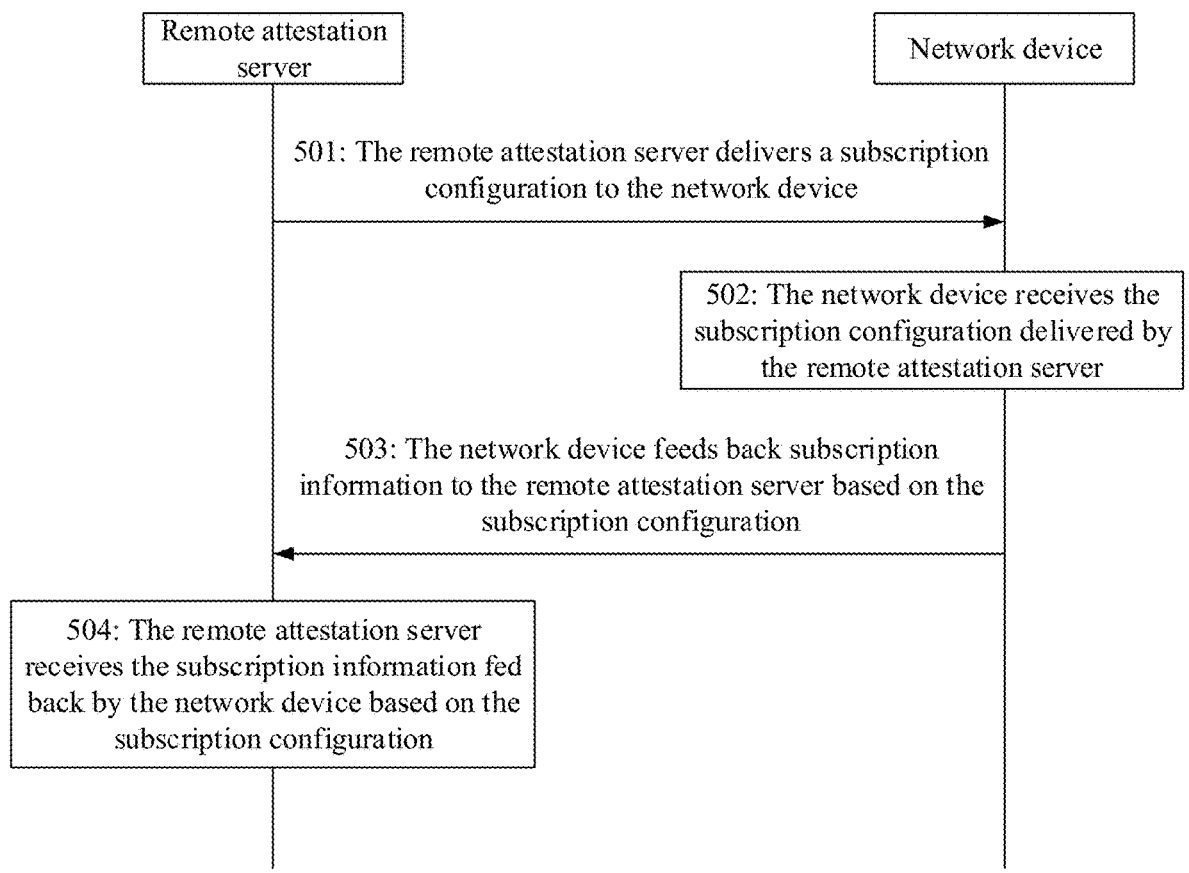
FIG. 5 is a flowchart of a data collection method according to an embodiment of this application.

Next, the data collection method provided in this embodiment of this application is used as an example for description. As shown in FIG. 5, the method includes the following steps.

In step 501, the remote attestation server delivers a subscription configuration to the network device, where the subscription configuration is used to subscribe to information related to remote attestation performed by the network device.

In this application, a subscription mode is used. The remote attestation server delivers the subscription configuration to the network device, to subscribe to the information related to the remote attestation performed by the network device. Optionally, the subscription configuration includes one or more of a data stream subscription configuration or an event subscription configuration. For example, the remote attestation server delivers the data stream subscription configuration to the network device, to subscribe to information related to a data stream for the remote attestation performed by the network device. Alternatively, the remote attestation server delivers the event subscription configuration to the network device, to subscribe to information related to an event for the remote attestation performed by the network device. Alternatively, the remote attestation server delivers the data stream subscription configuration and the event subscription configuration to the network device, to subscribe to information related to a data stream and an event for the remote attestation performed by the network device. The remote attestation server may or may not deliver the data stream subscription configuration and the event subscription configuration to the network device at the same time. This is not limited in this embodiment of this application.

The information related to the data stream may be various types of information related to trust of the network device, and includes but is not limited to one or more of the following information: integrity information of software at each layer of a trust chain that is recorded when the network device is booted up; dynamic integrity information of an operating system that is recorded when the network device runs; dynamic integrity information of software that is recorded when the network device runs; an identity certificate related to the network device; or a remote attestation certificate related to the network device.

The event includes but is not limited to one or more events of: a device boot event, a device upgrade event, a specific mode attack event, a master/slave switchover event, a board insertion/removal/switchover event, or a certificate life cycle event. The board switchover event includes an event of performing switchover on a board on which a service is located. A type of data stream and a type of event that the remote attestation server subscribes to may be determined based on an application scenario. This is not limited in this embodiment of this application.

Optionally, the subscription configuration may further include a subscription mode, the subscription mode is used to indicate a mode of feeding back the subscription information, and the subscription mode includes one or a combination of a periodic feedback based subscription mode and an event-triggered feedback based subscription mode. Optionally, different types of information correspond to different subscription modes. For example, for some key security data streams, an event-triggered feedback based subscription mode may be configured, so that when subscribed data changes, the network device immediately feeds back changed data to the remote attestation server. For a general security data stream, a periodic feedback based subscription mode may be configured, so that after a period expires, the network device feeds back the subscribed data to the remote attestation server. Certainly, the subscription mode may alternatively be determined by using another policy. For example, the subscription mode is determined based on an application scenario. This is not limited in this embodiment of this application.

Optionally, the subscription configuration may further include a filter configuration. The filter configuration is used to filter the information related to the data stream or the event. It should be understood that the data stream subscription configuration and the event subscription configuration are information subscriptions in a relatively wide range, but a filter may be understood as a limiting condition. To be specific, more detailed information is selected from information in a relatively wide range, so that collected data is more targeted.

In an optional implementation of this embodiment of this application, regardless of which content is configured for subscription in the subscription configuration, to deliver the subscription configuration to the network device, a mode of delivering the subscription configuration by the remote attestation server to the network device includes but is not limited to one or more of the following modes: establishing a network configuration protocol session with the network device, and/or delivering the subscription configuration to the network device based on the network configuration protocol session.

Optionally, in the method provided in this embodiment of this application, time validity of the subscription configuration may be further bound to time validity of the network configuration protocol session. After the subscription configuration is delivered based on the network configuration protocol session, dynamic subscription can be implemented based on the network configuration protocol session. In other words, when the network configuration protocol session is valid, the subscription may be continued based on the subscription configuration. Once the network configuration protocol session is disconnected, the subscription configuration is not valid, and the subscription cannot be continued based on the subscription configuration, so that a status of the network device can be dynamically monitored. In this mode, a corresponding dynamic subscription RPC can be defined to reduce extra information exchange.

Certainly, the time validity of the subscription configuration may be not bound to the time validity of the network configuration protocol session. After the subscription configuration is delivered based on the network configuration protocol session, the configuration subscription is implemented without depending on the network configuration protocol session. In other words, regardless of whether the network configuration protocol session is disconnected, the subscription can still be continued based on the subscription configuration, and the status of the network device can always be monitored.

Whether the time validity of the subscription configuration is bound to the time validity of the network configuration protocol session may be determined based on a type of collected data. For example, for some key security data, the time validity of the subscription configuration may be not bound to the time validity of the network configuration protocol session, and monitoring is always performed in an on-change mode. For general security data, the time validity of the subscription configuration may be bound to the time validity of the network configuration protocol session, to periodically read related information during a boot process of a NETCONF session.

In step 502, the network device receives the subscription configuration delivered by the remote attestation server.

Optionally, if the network device establishes the network configuration protocol session with the remote attestation server, after the remote attestation server delivers the subscription configuration based on the network configuration protocol session, the network device receives, based on the network configuration protocol session, the subscription configuration delivered by the remote attestation server.

In step 503, the network device feeds back subscription information to the remote attestation server based on the subscription configuration.

After receiving the subscription configuration delivered by the remote attestation server, the network device may obtain, based on the subscription configuration, the subscription information that needs to be fed back to the remote attestation server.

Optionally, if the subscription configuration includes the data stream subscription configuration, the feeding back subscription information to the remote attestation server based on the subscription configuration includes: feeding back one or more of the following information to the remote server based on the data stream subscription configuration: the integrity information of the software at each layer of the trust chain that is recorded when the network device is booted up; the dynamic integrity information of the operating system that is recorded when the network device runs; the dynamic integrity information of the software that is recorded when the network device runs; the identity certificate related to the network device; and/or the remote attestation certificate related to the network device. A type of subscription information to be fed back can be determined based on a subscription requirement in the subscription configuration. For example, if the subscription configuration requires the network device to subscribe to the integrity information of the software at each layer of the trust chain that is recorded when the network device is booted up, the network device feeds back to the remote attestation server based on the subscription configuration, the integrity information of the software at each layer of the trust chain that is recorded when the network device is booted up.

Optionally, if the subscription configuration includes the event subscription configuration, the feeding back subscription information to the remote attestation server based on the subscription configuration includes: feeding back, to the remote server based on the event subscription configuration, information related to one or more of the following triggered events:

the device boot event, the device upgrade event, the specific mode attack event, the master/slave switchover event, the board insertion/removal/switchover event, and/or the certificate life cycle event. A type of subscription information to be fed back can be determined based on a subscription requirement in the subscription configuration. For example, if the subscription configuration requires to subscribe to information related to the device boot, after the network device is booted up, the network device feeds back, based on the subscription configuration, information obtained after the network device is booted up as the subscription information to the remote attestation server.

Optionally, the subscription configuration further includes a subscription mode, the subscription mode is used to indicate the mode of feeding back the subscription information, and the subscription mode includes a periodic feedback based subscription mode, an event-triggered feedback based subscription mode, or a combination of a periodic feedback based subscription mode and an event-triggered feedback based subscription mode. Optionally, different types of information correspond to different modes of feeding back the subscription information. The network device feeds back the subscription information to the remote attestation server based on the subscription mode included in the subscription configuration. A specific subscription mode used to feed back the subscription information may be determined based on a subscription requirement in the subscription configuration. For example, if the subscription mode required by the subscription configuration is the periodic feedback based subscription mode, the network device feeds back obtained subscription information to the remote attestation server after the period expires.

If the subscription configuration further includes a filter configuration, after collecting the information related to the data stream and the event that are subscribed to in the subscription configuration, the network device filters the collected information based on the filter configuration, and then obtains subscription information that meets the subscription requirement.

In step 504, the remote attestation server receives the subscription information fed back by the network device based on the subscription configuration.

After receiving the subscription information fed back by the network device, the remote attestation server completes data collection, and may perform remote attestation based on the subscription information. For example, verification is performed according to a specific policy, to finally prove whether the network device is trusted. In this way, the remote attestation can dynamically monitor a security attribute of the network device, to prevent the network device from being tampered with, replaced, or copied, or the like.

In this embodiment of this application, the remote attestation server delivers the subscription configuration to the network device, and the network device may automatically feedback the subscription information based on the subscription configuration, so that a data collection mode in the remote attestation is more flexible and timely, thereby reducing a security risk. In addition, because the remote attestation server does not need to deliver the subscription configuration for a plurality of times, extra message exchange is reduced, thereby improving data collection efficiency.

Further, the method provided in this embodiment of this application further includes: The remote attestation server delivers a data processing parameter to the network device. The network device receives the data processing parameter delivered by the remote attestation server. On this basis, the subscription information fed back by the network device to the remote attestation server is information obtained after processing is performed based on the data processing parameter. In this mode, the remote attestation server sends data processing parameters such as a nonce, a hash signature algorithm, and a specified TPM name to the network device in advance for subsequent use.

For example, to obtain a PCR value of a TPM, the data processing parameters include the nonce, a PCR-list array, a signature algorithm identifier of a complete message, and a public key identifier (public-key-identifier) identifier that can be used. Content of each parameter is as follows.

The Nonce is different each time. A value of the nonce represented as a time number is recorded by using a time stamp or a value of the nonce represented as a specific number is increased each time. The remote attestation server and the network device may determine time validity and non-repetition of a received message based on the nonce. In addition to using the nonce to confirm the time validity and the non-repetition of the message, in some embodiments of this application, the remote attestation server may also send a seed and a continuously calculated hash algorithm identifier, and the network device and the remote attestation server perform an operation synchronously, thereby jointly confirming the time validity and the non-repetition of the received remote attestation message. Alternatively, a time-based unidirectional attestation (time-based unidirectional attestation, RATS TUDA) mechanism may be used to implement a function similar to that of the nonce. The RATS TUDA mechanism is essentially a unidirectional remote attestation protocol. To be specific, an attester (a network device) unidirectionally sends integrity evidence of the attester to a verifier (a remote attestation server), and the verifier completes a verification function. The RATS TUDA mechanism mainly introduces a trusted third party, namely a trusted time stamp authority (TSA). The verifier uses time stamp information of the attester carried in the received remote attestation message and a time stamp token (TST) provided by the TSA, to jointly determine time validity and non-repetition of the received remote attestation message.

The PCR-list array includes a plurality of piece of PCR information. The PCR information includes a PCR register number and a specific signature algorithm used for the PCR information, for example, a digital signature algorithm (DSA), an elliptic curve digital signature algorithm (ECDSA), or an Edwards-curve digital signature algorithm (EDDSA).

The signature algorithm of the complete message includes the DSA, the ECDSA, the EDDSA, or the like. In this embodiment of this application, the parameter is a group of optional signature algorithms. The attester can independently randomly select a signature algorithm, and indicate the selected signature algorithm in a returned message.

The public key identifier (public-key-identifier) that can be used specifies a public/private key pair used for signature and verification. In this embodiment of this application, the parameter is a group of optional public key numbers. The attester can independently randomly select a public key and specify the selected public key in the returned message.

A target TPM name/number is a group of TPM names. The attester may make decisions according to some policies, for example, (1) selecting a TPM for collection; (2) sending a TPM whose PCR value changes; and (3) sending PCR values of all TPMs in a specific sequence.

For another example, if the verifier needs to obtain a PCR value of a stored management log (stored management log, SML) stored in the attester (the network device), the sent data processing parameters include a node name, a log record selection mode of the SML, a log type, and a PCR-list array. Content of each parameter is as follows.

The node name: In this embodiment of this application, the parameter is a group of node names. After the verifier delivers the node name to the attester, the attester can make decisions according to some policies. For example, (1) the attester selects a node for collection; (2) sending a node whose SML log file changes; and (3) sending all/updated SML values of each node in a specific sequence.

The log record selection mode of the SML is as follows: The log record is selected after the last one is obtained, the log record is obtained according to a specified number, or the log record is obtained according to specified time. After the verifier delivers the log selection mode of the SML to the attester, the attester can independently randomly select a selection mode and specify the selected mode in the returned message.

The log type is a BIOS or an integrity measurement architecture (IMA).

The PCR-list array includes the plurality of pieces of PCR information. The PCR information includes the PCR register number and the specific signature algorithm used for the PCR information, for example, the DSA, the ECDSA, or the EDDSA.

It should be understood that the foregoing two examples of the data processing parameter are merely example embodiments of the method provided in this embodiment of this application, and a data processing parameter of another type or with other content may be further delivered based on a different application scenario. This is not limited in this embodiment of this application. Regardless of which type of data processing parameter is used, after obtaining related information used for the remote attestation, the network device may process the obtained information based on the data processing parameter, and then feed processed information back to the remote attestation server. For example, the obtained information is encrypted based on an encryption algorithm in the data processing parameter.

In conclusion, in this embodiment of this application, in the pub/sub and push mechanism of the netconf, a widely-used scenario exists in an existing fixed network, and advantages of the mechanism, such as flexibility, high efficiency, proactive notification, and time validity are inherited. In addition, a mechanism of the remote attestation triggered by an event on a device side is implemented by proactively feeding back the subscription information by the network device. In addition, the nonce is random and synchronous, so that the information can be used in an interaction mechanism provided in this embodiment of this application.

For ease of understanding, the following two examples are used for description.

(1) For an Event that is Subscribed to in a Configuration Subscription Mode

1. For example, the subscription configuration includes the data stream subscription configuration, the event sub scription configuration, the filter subscription configuration, and the subscription mode, and the remote attestation server further delivers the data processing parameter. Content is as follows.

Content of the data stream subscription configuration includes:

a data stream: per-trust-evidence (PCR-trust-evidence); bios-log-trust-evidence (BIOS-log-trust-evidence); and ima-log-trust-evidence (IMA-log-trust-evidence).

Content of the event subscription configuration includes:

an event name: 1001; and an event type: Device boot completes.

The data processing parameters of the data stream include:

a type of remote attestation: tpm2-attestation-challenge;

a per library: aaa;

pcr-indices: 6;

a hash algorithm id: 14; nonce-value: 0x564ac291;

signature-identifier-type: TPM_ALG-ID:2;

Key-id: public-key 0x784a22bf.

The filter subscription configuration includes:

a yang model of a vendor's device: xxx-vendor-device; and a device id of a device: 030DLA106C0522221111.

The subscription mode includes:

periodic feedback: periodic;

a subscription period: 500; and a security data stream to be pushed: 1001 (which is the same as a device boot event id in the event subscription configuration).

Based on the preceding subscription configuration, the configuration information is as follows:

```
<rpcnetconf:message-id="101"
    xmlns:netconf="urn:ietf:params:xml:ns:netconf:base:1.0">
<edit-config>
  <streams>
    <stream>
      <name>pcr-trust-evidence</name>
    </stream>
    <stream>
      <name>bios-log-trust-evidence</name>
    </stream>
    <stream>
      <name>ima-log-trust-evidence</name>
    </stream>
  </streams>
  <subscriptions
      xmlns="urn:ietf:params:xml:ns:yang:ietf-subscribed-notifications">
  <events>
    <event>
      <name>1001</name>
      <type>device-startup-ok</type>
    </event>
  </events>
  <subscription>
      <subscription-id>100</subscription-id>
      <rats-type>
        <tpm2-attestation-challenge>
          <pcr-list>
            <id>aaa</id>
            <pcr-indices>6</pcr-indices>
            <algo-registry-type>
              <ietf-ni-hash-algo-id>14</ietf-ni-hash-algo-id>
            </algo-registry-type>
          </pcr-list>
          <nonce-value>0x564ac291</nonce-value>
          <signature-identifier-typ>
            <TPM_ALG-ID>2</TPM_ALG-ID>
```

```
        </signature-identifier-typ>
        <key-identifier>
            <public-key>0x784a22bf</public-key>
                </key-identifier>
            </tpm2-attestation-challenge>
        </rats-type>
        <stream-subtree-filter>
            <xxx-vendor-device
                xmlns="urn:xxx:params:xml:ns:yang:xxx-vendor-device">
                <device-id>030DLA106C0522221111</device-id>
            </xxx-vendor-device>
        </stream-subtree-filter>
        <periodic xmlns="urn:ietf:params:xml:ns:yang:ietf-yang-push:1.0">
            <sub-rats-event xmlns="urn:ietf:params:xml:ns:yang:ietf-rats-sub-push:1.0">
                1001</sub-rats-event>
            <period>500</period>
        </periodic>
      </subscription>
    </subscriptions>
  </edit-config>
</rpc>
```

A yang data model is defined, a subscription data stream type and a subscription event type are described, and the configuration subscription is implemented. FIG. 6 shows a tree structure of a related configuration subscription data model. An example of the tree structure is written based on IETF RFC8340.

Figure 7:
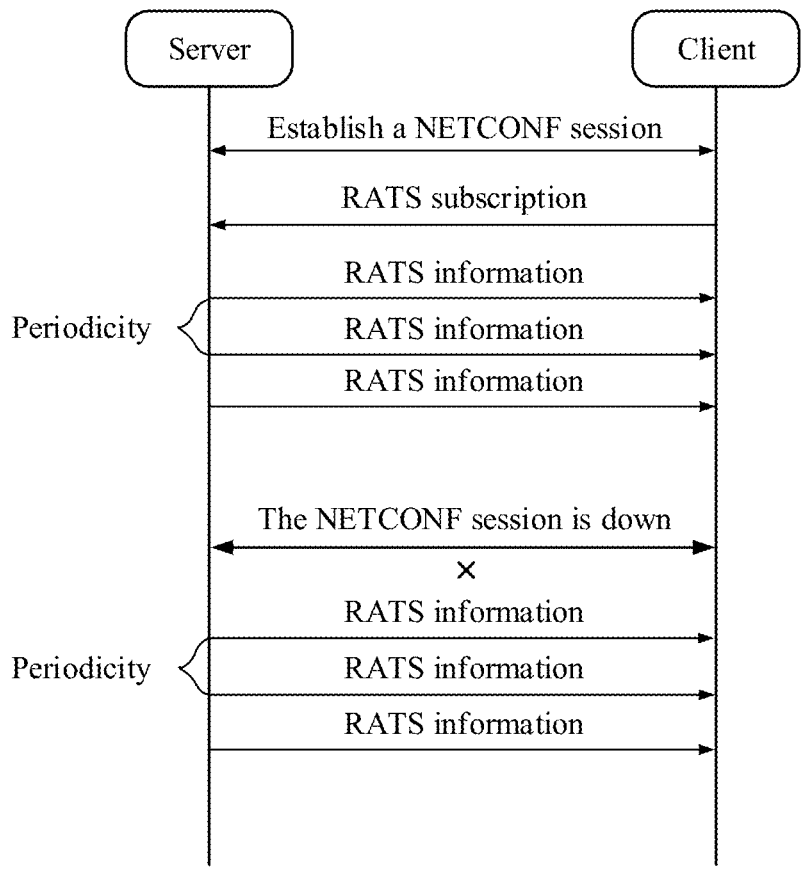
FIG. 7 is a schematic diagram of session interaction according to an embodiment of this application.

For a lower-layer transmission protocol NETCONF, the remote attestation server is a NETCONF client, and the network device is a NETCONF server. As shown in FIG. 7, the NETCONF client (the remote attestation server) first establishes a netconf session with the NETCONF server (the network device), and delivers the concerned remote attestation subscription configuration to the NETCONF server by using the yang data model. The NETCONF server periodically sends a notification, to periodically push related data, namely, the subscription information, to the NETCONF client. The configuration subscription does not depend on the netconf session. After the session is down (session is down), the configuration subscription still exists, and the NETCONF server still periodically sends a notification to the NETCONF client.

2. For example, the subscription configuration includes the data stream subscription configuration, the event subscription configuration, the filter subscription configuration, and the subscription mode, and the remote attestation server further delivers the data processing parameter.

Content is as follows.

Content of the data stream subscription configuration includes the following: a data stream: per-trust-evidence (PCR-trust-evidence), bios-log-trust-evidence (BIOS-log-trust-evidence), and ima-log-trust-evidence (IMA-log-trust-evidence).

Content of the event subscription configuration includes:
an event name: 1002; and
an event type: master/slave switchover.

The data processing parameters of the data stream include:
a type of remote attestation: log-retrieval;
a log-selector configuration: node-name is aaa;
a node-physical-index: 77;
an index-type: selected as last-entry-value: 010101;
a log-type: bios; a per library: aaa; per-indices: 7;
a hash algorithm id: 14; and a log-entry-quantity: 69.

The filter subscription configuration includes:
a yang model of a vendor's device: xxx-vendor-device; and
a device id of a device: xxxx.

The subscription mode includes:
on-change reporting: on-change;
a security data stream to be pushed: 1002 (which is the same as a master/slave switchover event id).

Based on the preceding subscription configuration, the configuration information is as follows:

```
<rpcnetconf:message-id="101"
    xmlns:netconf="urn:ietf:params:xml:ns:netconf:base:1.0">
    <edit-config>
    <streams>
        <stream>
            <name>pcr-trust-evidence</name>
        </stream>
        <stream>
            <name>bios-log-trust-evidence</name>
        </stream>
        <stream>
            <name>ima-log-trust-evidence</name>
        </stream>
    </streams>
    <subscriptions
        xmlns="urn:ietf:params:xml:ns:yang:ietf-subscribed-notifications">
        <events>
            <event>
                <name>1002</name>
```

```
                <type>master-slave-switchover</type>
            </event>
        </events>
        <subscription>
            <subscription-id>100</subscription-id>
            <rats-type>
                <log-retrieval>
                    <log-selector>
                      <node-name>linkcard-2</node-name>
                      <node-physical-index>77</node-physical-index>
                        <index-type>
                        <last-entry-value>67</last-entry-value>
                        <index-type>
                        </log-selector>
                            <log-type>bios</log-type>
                            <pcr-list>
                               <id>aaa</id>
                            <pcr-indices>7</pcr-indices>
                            <algo-registry-type>
                            <ietf-ni-hash-algo-id>5</ietf-ni-hash-algo-id>
                            </algo-registry-type>
                            </pcr-list>
                    <log-entry-quantity>69</log-entry-quantity>
                </log-retrieval>
            </rats-type>
            <stream-subtree-filter>
                <xxx-vendor-device
                    xmlns="urn:xxx:params:xml:ns:yang:xxx-vendor-device">
                    <device-id>030DLA106C0522221111</device-id>
                </xxx-vendor-device>
            </stream-subtree-filter>
        <on-change xmlns="urn:ietf:params:xmins:yangletf-yang-push:1.0">
            <sub-rats-event xmlns="urn:ietf:params:xml:ns:yang:ietf-rats-sub-push:1.0">
                1001</sub-rats-event>
            </on-change>
        </subscription>
    </subscriptions>
  </edit-config>
</rpc>
```

Figure 8:
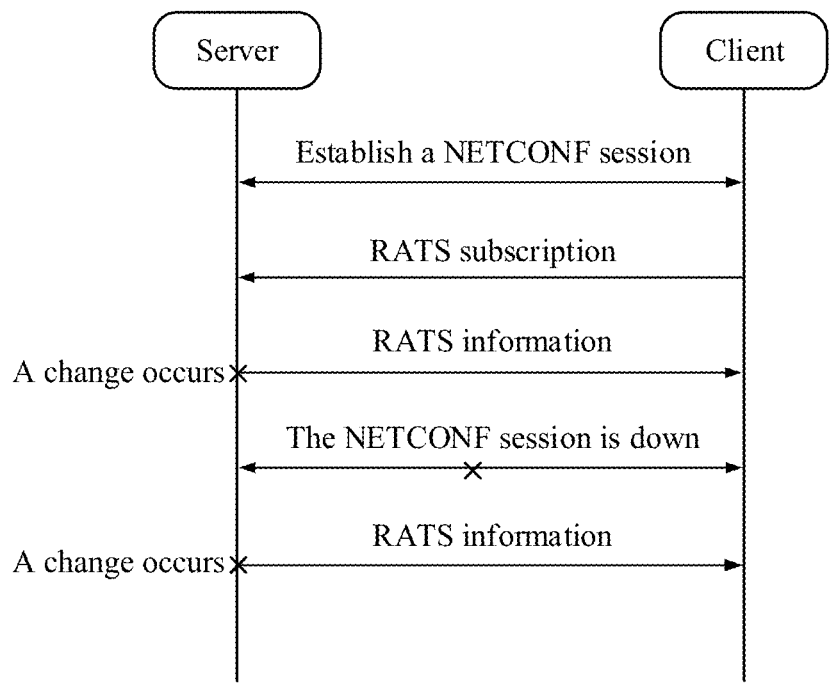
FIG. 8 is a schematic diagram of session interaction according to an embodiment of this application.

As shown in FIG. 8, the NETCONF client establishes a netconf session with the NETCONF server, and delivers the concerned remote attestation subscription configuration to the NETCONF server by using the yang data model. When subscribed key data changes, the NETCONF server sends a notification, to push related data, namely, the subscription information, to the NETCONF client. The configuration subscription may not depend on the netconf session. After the session is down, the configuration subscription still exists, and the NETCONF server still periodically sends a notification to the client.

When the subscription event is triggered, the NETCONF server sends a notification in the following format to the NETCONF client. FIG. 9 shows a tree structure of a related dynamic subscription data model. An example of the tree structure is written based on the IETF RFC8340.

(2) For an Attestation Event that is Subscribed to in a Dynamic Subscription Mode 1. For example, the subscription configuration includes the data stream subscription configuration, the filter subscription configuration, and the subscription mode. Content is as follows:

Content of the data stream subscription configuration includes:

a type of remote attestation: tpm2-attestation-challenge;

a per library: aaa; per-indices: 7;

a hash algorithm id: 5;

a nonce-value: 0xa45668b1;

signature-identifier-type: TPM_ALG-ID:2; and

Key-id: public-key 0xad3567c3.

The filter subscription configuration includes:

a yang model of a vendor's device: xxx-vendor-device; and a device id of a device: xxxx.

The subscription mode includes:

periodic reporting: periodic;

a subscription period: 500; and a security data stream to be pushed: 1001 (which is the same as the device boot event id).

Based on the preceding subscription configuration, the configuration information is as follows:

```
<rpcnetconf:message-id="101"
    xmlns:netconf="urn:ietf:params:xml:ns:netconf:base:1.0">
    <establish-subscription
        xmlns="urn:ietf:params:xml:ns:yang:ietf-subscribed-notifications">
    <rats-type>
    <tpm2-attestation-challenge>
            <pcr-list>
        <id>aaa</id>
```

```
            <pcr-indices>7</pcr-indices>
            <algo-registry-type>
            <ietf-ni-hash-algo-id>5</ietf-ni-hash-algo-id>
        </algo-registry-type>
        </pcr-list>
        <nonce-value>0xa45668b1</nonce-value>
        <signature-identifier-typ>
            <TPM_ALG-ID>2</TPM_ALG-ID>
            </signature-identifier-typ>
        <key-identifier>
                <public-key>0xad3567c3</public-key>
        </key-identifier>
        </tpm2-attestation-challenge>
        </rats-type>
            <stream-subtree-filter>
                <xxx-vendor-device xmlns="urn:xxx:params:xml:ns:yang:xxx-vendor-device">
                device-id>xxxxx</device-id>
                </xxx-vendor-device>
            </stream-subtree-filter>
            <periodic xmlns="urn:ietf:params:xml:ns:yang:ietf-yang-push:1.0">
            <sub-rats-event xmlns="urn:ietf:params:xml:ns:yang:ietf-rats-sub-push: 1.0">1001</sub-rats-event>
                <period>500</period>
            </periodic>
    </establish-subscription>
</rpc>
```

The yang data model is defined, a subscription data stream type and a subscription event type are described, and the dynamic subscription is implemented. FIG. 10 shows a tree structure of a related dynamic subscription data model. An example of the tree structure is written based on the IETF RFC8340.

Figure 11:
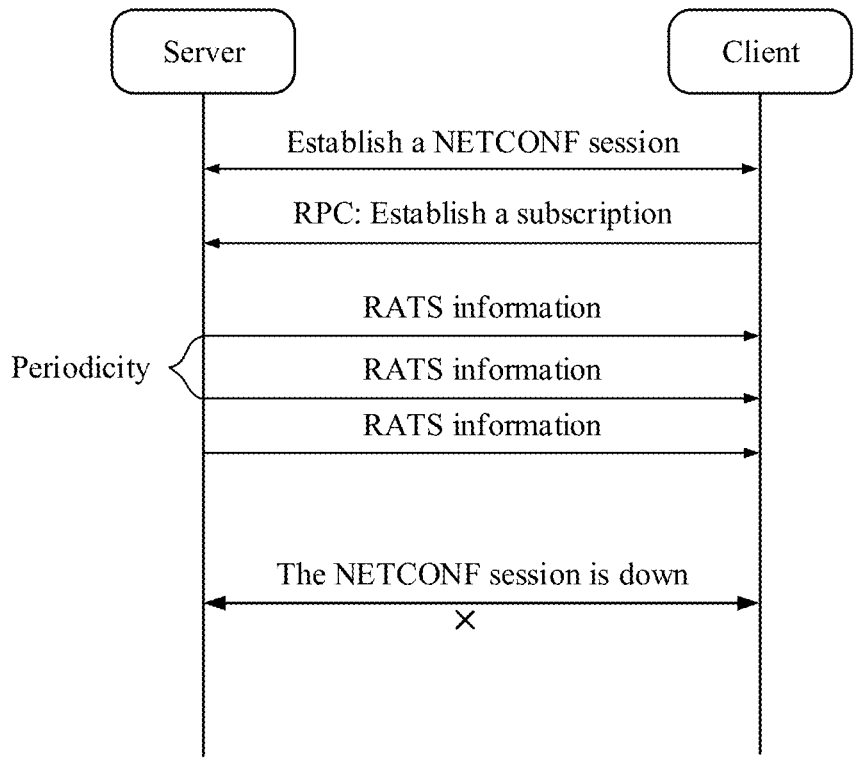
FIG. 11 is a schematic diagram of session interaction according to an embodiment of this application.

In the dynamic subscription, the NETCONF client sends a subscription RPC to the NETCONF server when the netconf session starts. The NETCONF server periodically pushes the subscription information or pushes the subscription information in the on-change mode to the NETCONF client within a period when the netconf session exists. For example, as shown in FIG. 11, the NETCONF client establishes the netconf session with the NETCONF server, and delivers the concerned remote attestation subscription configuration to the NETCONF server by using the RPC. The NETCONF server periodically sends a notification, to periodically push related data, namely, the subscription information, to the NETCONF client. The dynamic subscription depends on the netconf session. When the session is down, the subscription disappears.

2. For example, the subscription configuration includes the data stream subscription configuration, the filter subscription configuration, and the subscription mode. Content is as follows.

Content of the data stream subscription configuration includes:

a type of remote attestation: log-retrieval;

a log-selector configuration: node-name is linecard-2;

node-physical-index: 77;

an index-type: selected as last-entry-value: 28;

a log-type: bios; a per library: aaa; per-indices: 7;

a hash algorithm id: 5; and a log-entry-quantity: 69.

Content of the event subscription configuration includes:

an event name: 1008; and an event type: device upgrade.

Content of the filter subscription configuration includes:

a yang model of a vendor's device: xxx-vendor-device; and a device id of a device: xxxx.

The subscription mode includes:

on-change reporting: on-change;

a security data stream to be pushed: 1008 (which is the same as a device upgrade event id).

Based on the preceding subscription configuration, the configuration information is as follows:

```
<rpcnetconf:message-id="101"
    xmlns:netconf="urn:ietf:params:xml:ns:netconf:base:1.0">
        <establish-subscription
            xmlns="urn:ietf:params:xml:ns:yang:ietf-subscribed-notifications">
            <rats-type>
            <log-retrieval>
            <log-selector>
                <node-name>aaa</node-name>
                <node-physical-index>77</node-physical-index>
                <index-type>
                    <last-entry-value>010101</last-entry-value>
                <index-type>
            </log-selector>
            <log-type>bios</log-type>
                <pcr-list>
                <id>aaa</id>
```

-continued

```
        <pcr-indices>73</pcr-indices>
        <algo-registry-type>
        <ietf-ni-hash-algo-id>14</ietf-ni-hash-algo-id>
        </algo-registry-type>
        </pcr-list>
        <log-entry-quantity>69</log-entry-quantity>
      </log-retrieval>
      </rats-type>
      <stream-subtree-filter>
      <xxx-vendor-device xmlns="urn:xxx:params:xml:ns:yang:xxx-vendor-device">
        device-id>xxxxx</device-id>
    </xxx-vendor-device>
    </stream-subtree-filter>
    <on-change xmlns="urn:ietf:params:xmins:yang:ietf-yang-push:1.0">
    <sub-rats-event xmlns="urn:ietf:params:xml:ns:yang:ietf-rats-sub-
push:1.0">1008</sub-rats-event>
      </on-change>
    </establish-subscription>
</rpc>
```

Figure 12:
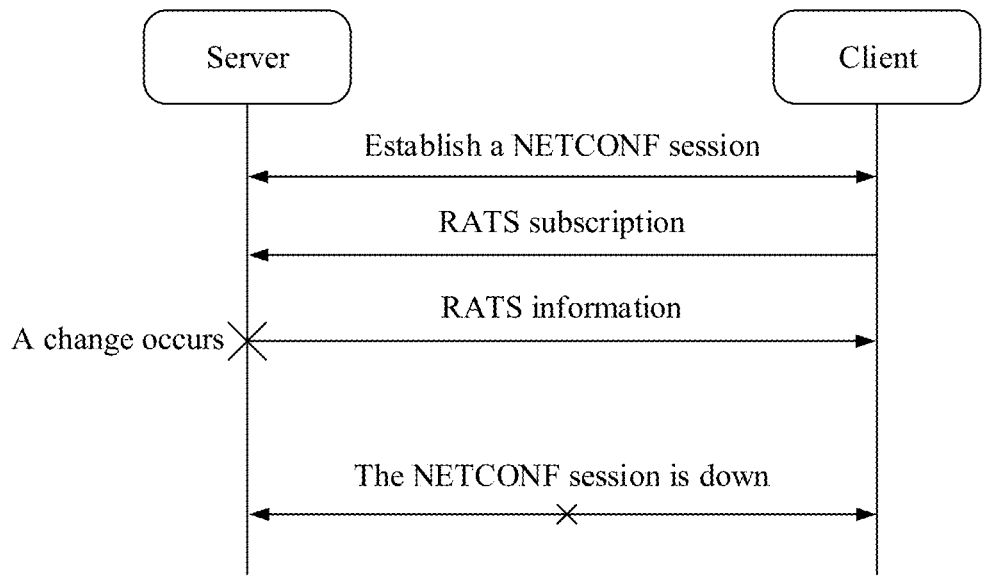
FIG. 12 is a schematic diagram of session interaction according to an embodiment of this application.

As shown in FIG. 12, the NETCONF client establishes a netconf session with the NETCONF server and delivers the concerned remote attestation subscription configuration to the NETCONF server by using the RPC. When subscribed key data changes, the NETCONF server sends a notification, to push related data, namely, the subscription information to the NETCONF client. The dynamic subscription depends on the netconf session. When the session is down, the subscription disappears.

When the subscription event is triggered, the NETCONF server sends a notification in the following format to the NETCONF client. FIG. 13 shows a tree structure of a related dynamic subscription data model. An example of the tree structure is written based on the international standard RFC 8340.

In conclusion, in the method provided in this embodiment of this application, a latest netconf/representational state transfer configuration protocol (representational state transfer configuration protocol, RESCONF) pub (publication)/sub (subscription) and push mechanism is used, and the method is widely used in an existing fixed network. It should be understood that the mechanism can be easily converted into another protocol and message encoding format, for example, an RESCONF+JS object notation (javascript object notation, JSON)/an extensible markup language (extensible markup language, XML), and a constrained application protocol (CoAP)+concise binary object presentation (CBOR). In this way, the mechanism can be easily transplanted to scenarios such as a web (Internet), an IoT, and a mobile device. A data collection method of the other protocol has a same principle as the NETCONF. Details are not described herein again.

Based on a same technical concept, an embodiment of this application further provides a data collection apparatus. The apparatus is used in a remote attestation process. Referring to FIG. 14, the apparatus includes:
a sending module 141, configured to deliver a subscription configuration to a network device, where the subscription configuration is used to subscribe to information related to remote attestation performed by the network device; and
a receiving module 142, configured to receive subscription information fed back by the network device based on the subscription configuration.

Optionally, the sending module 141 is further configured to deliver a data processing parameter to the network device, where the subscription information includes information obtained after processing is performed based on the data processing parameter.

Optionally, the sending module 141 is configured to: establish a network configuration protocol session with the network device, and deliver the subscription configuration to the network device based on the network configuration protocol session.

Figure 15:
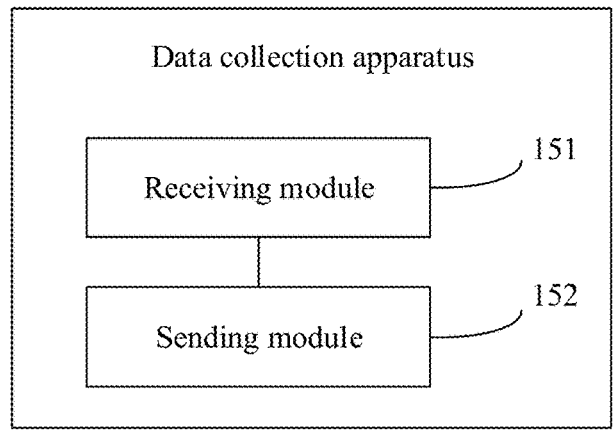
FIG. 15 is a schematic structural diagram of a data collection apparatus according to an embodiment of this application.

Based on a same technical concept, an embodiment of this application further provides a data collection apparatus. The apparatus is used in a remote attestation process. Referring to FIG. 15, the apparatus includes:
a receiving module 151, configured to receive a subscription configuration delivered by a remote attestation server, where the subscription configuration is used to subscribe to information related to remote attestation performed by the network device; and
a sending module 152, configured to feedback subscription information to the remote attestation server based on the subscription configuration.

Optionally, if the subscription configuration includes a data stream subscription configuration, the sending module 152 is configured to feedback one or more of the following information to the remote server based on the data stream subscription configuration:
integrity information of software at each layer of a trust chain that is recorded when the network device is booted up;
dynamic integrity information of an operating system that is recorded when the network device runs;
dynamic integrity information of software that is recorded when the network device runs;
an identity certificate related to the network device; and/or
a remote attestation certificate related to the network device.

Optionally, if the subscription configuration includes an event subscription configuration, the sending module 152 is configured to feedback, to the remote server based on the event subscription configuration, information related to one or more of the following triggered events: a device boot event, a device upgrade event, a specific mode attack event, a master/slave switchover event, a board insertion/removal/switchover event, and/or a certificate life cycle event.

Optionally, the subscription configuration further includes a subscription mode, the subscription mode is used to indicate a mode of feeding back the subscription information, and the subscription mode includes one or a combination of a periodic feedback based subscription mode and an event-triggered based subscription mode; and the sending module 152 is configured to feed back the subscription information to the remote attestation server based on the subscription mode included in the subscription configuration.

Optionally, the receiving module 151 is further configured to receive a data processing parameter delivered by the remote attestation server, and the subscription information fed back by the sending module includes information obtained after processing is performed based on the data processing parameter.

Optionally, the receiving module 151 is configured to: establish a network configuration protocol session with the remote attestation server, and receive, based on the network configuration protocol session, the subscription configuration delivered by the remote attestation server.

When the foregoing provided apparatus implements functions of the apparatus, division into the foregoing functional modules is merely used as an example for description. In an actual application, the foregoing functions may be allocated and implemented by different functional modules based on requirements, that is, an internal structure of a device is divided into different functional modules, to implement all or some of the foregoing described functions. In addition, the apparatuses provided in the foregoing embodiments and the method embodiments pertain to a same concept. For a specific implementation process thereof, refer to the method embodiments. Details are not described herein again.

Figure 16:
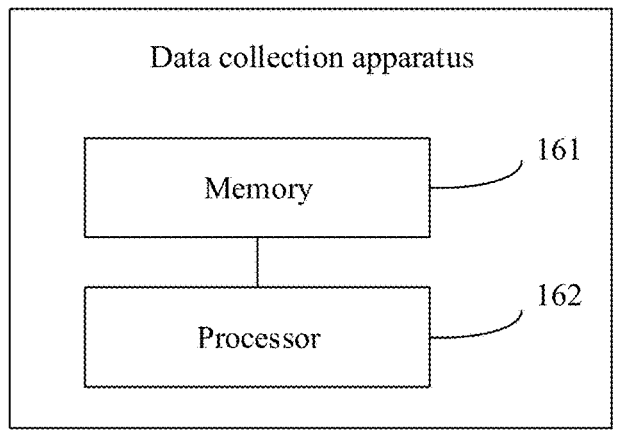
FIG. 16 is a schematic structural diagram of a data collection device according to an embodiment of this application.

Based on a same concept, an embodiment of this application further provides a data collection device. Referring to FIG. 16, the device includes a memory 161 and a processor 162. The memory 161 stores at least one instruction, and the at least one instruction is loaded and executed by the processor 162, to implement any one of the foregoing data collection methods provided in the embodiments of this application.

Figure 17:
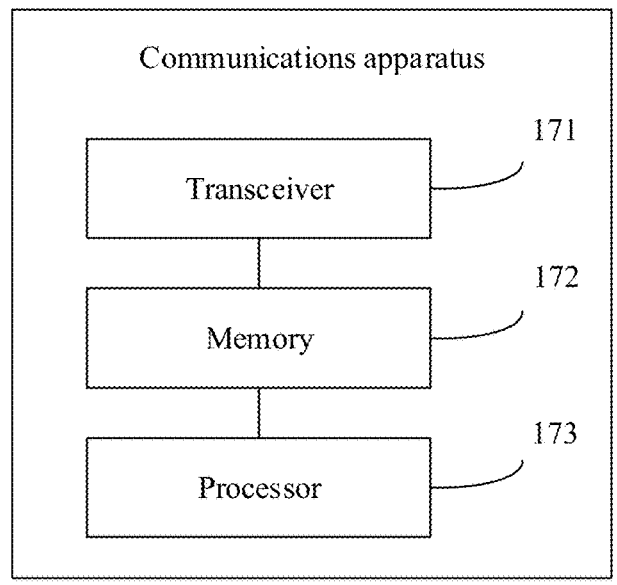
FIG. 17 is a schematic structural diagram of a communications apparatus according to an embodiment of this application.

An embodiment of this application further provides a communications apparatus. Referring to FIG. 17, the apparatus includes a transceiver 171, a memory 172, and a processor 173. The transceiver 171, the memory 172, and the processor 173 communicate with each other through an internal connection channel. The memory 172 is configured to store instructions. The processor 173 is configured to execute the instructions stored in the memory, to control the transceiver 171 to receive a signal and control the transceiver 171 to send a signal. In addition, when the processor 173 executes the instructions stored in the memory 172, the processor 173 is enabled to perform any one of the foregoing data collection methods.

An embodiment of this application further provides a communications system. The system includes the apparatus shown in FIG. 14 and the apparatus shown in FIG. 15.

A data collection device in this application may be a personal computer (PC), a server, or a network device. For example, the data collection device may be a router, a switch, a server, or the like.

Based on a same concept, an embodiment of this application further provides a computer-readable storage medium. The storage medium stores at least one instruction, and the instruction is loaded and executed by a processor to implement any one of the foregoing data collection methods provided in the embodiments of this application.

An embodiment of this application further provides a chip, including a processor. The processor is configured to invoke, from a memory, and run instructions stored in the memory, so that a communications device on which the chip is installed performs any one of the foregoing data collection methods.

An embodiment of this application further provides a chip, including an input interface, an output interface, a processor, and a memory. The input interface, the output interface, the processor, and the memory are connected through an internal connection channel. The processor is configured to execute code in the memory. When the code is executed, the processor is configured to perform any one of the foregoing data collection methods.

The processor may be a central processing unit (CPU), or may be another general-purpose processor, a digital signal processor (DSP), or an application-specific integrated circuit (ASIC), a field programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an advanced RISC machine ARM) architecture.

Further, in an optional embodiment, there are one or more processors, and there are one or more memories. Optionally, the memory may be integrated with the processor, or the memory and the processor may be separately disposed. The memory may include a read-only memory and a random access memory, and provide instructions and data to the processor. The memory may further include a non-volatile random access memory. For example, the memory may further store information about a device type.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. For example but not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

This application provides a computer program. When the computer program is executed by a computer, a processor or the computer may be enabled to perform corresponding steps and/or procedures in the foregoing method embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) mode. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid state drive (SSD)).

The foregoing descriptions are merely the embodiments of this application, but are not intended to limit this application. Any modification, equivalent replacement, or improvement made without departing from the spirit and principle of this application should fall within the protection scope of this application.

What is claimed is:

1. A data collection method for a remote attestation process, comprising:
   delivering without using a polling challenge-response mechanism, by a remote attestation (RA) server in a trusted computing system, a subscription configuration to a device acting as an RA client in the trusted computing system, wherein the subscription configuration is for subscribing to information related to remote attestation to be performed by the RA server to prove whether the device is trusted,
   wherein the subscription configuration comprises a data stream subscription configuration specifying multiple types of subscribed information to be sent from the device, the multiple types of subscribed information comprising at least two of:
      integrity information of software at each layer of a trust chain, wherein the integrity information of software at each layer of the trust chain is recorded when the device is booted up;
      dynamic integrity information of an operating system that is recorded when the device runs;
      dynamic integrity information of software that is recorded when the device runs;
      an identity certificate related to the device; or
      a remote attestation certificate related to the device,
   wherein the subscription configuration further comprises a subscription mode configuration that specifies, for each of the multiple types of subscribed information to be sent from the device, a corresponding subscription mode selected from:
   a periodic feedback based subscription mode, in which subscribed information is pushed to a subscriber after a specified time period expires; and
   an event-triggered feedback based subscription mode, in which subscribed information is pushed to the subscriber when the subscribed information changes; and
   receiving, by the remote attestation server, each of the multiple types subscribed information sent by the device in the corresponding subscription mode determined by the device based on the data stream subscription configuration and the subscription mode configuration included in the subscription configuration,
   wherein the subscription mode configuration specifies that at least a first type of the multiple types of subscribed information is to be sent in the periodic feedback-based subscription mode, and that at least a different second type of the multiple types of subscribed information is to be sent in the event-triggered feedback-based subscription mode.

2. The method according to claim 1, wherein the subscription configuration further comprises an event subscription configuration.

3. The method according to claim 2, wherein the subscribed information comprises information related to one or more of triggered events including: device boot, device upgrade, a specific mode attack event, master/slave switchover, board insertion/removal/switchover, or a certificate life cycle event.

4. The method according to claim 1, wherein the subscription configuration further comprises a filter configuration, and the subscribed information comprises information obtained after filtering is performed based on the filter configuration.

5. The method according to claim 1, further comprising: delivering a data processing parameter to the device, wherein the subscribed information comprises information obtained after processing is performed based on the data processing parameter.

6. The method according to claim 1, further comprising:
   establishing a network configuration protocol session with the device; and
   delivering the subscription configuration to the device based on the network configuration protocol session.

7. The method according to claim 6, time validity of the subscription configuration is bound to time validity of the network configuration protocol session.

8. The method according to claim 1, wherein the subscription mode for sending the subscribed information is determined by the device based on a type of the subscribed information.

9. The method according to claim 1, wherein subscribed information to be transmitted by the device in the event-triggered feedback based subscription mode has a higher level of security than subscribed information to be transmitted by the device in the periodic feedback based subscription mode.

10. A data collection method for a remote attestation process, comprising:
    receiving without using a polling challenge-response mechanism, by a device, a subscription configuration delivered by a remote attestation (RA) server in a trusted computing system, wherein the subscription configuration is used to subscribe to information related to remote attestation that to be performed by the RA server to prove whether the device is trusted,
    wherein the subscription configuration comprises a data stream subscription configuration specifying multiple types of subscribed information to be sent from the device, the multiple types of subscribed information comprising at least two of:
       integrity information of software at each layer of a trust chain, wherein the integrity information of software at each layer of the trust chain is recorded when the device is booted up;
       dynamic integrity information of an operating system that is recorded when the device runs;
       dynamic integrity information of software that is recorded when the device runs;
       an identity certificate related to the device; or
       a remote attestation certificate related to the device,
    wherein the subscription configuration further comprises a subscription mode configuration that specifies, for each of the multiple types of subscribed information to be sent from the device, a corresponding subscription mode selected from:
a periodic feedback based subscription mode, in which subscribed information is pushed to a subscriber after a specified time period expires; and
an event-triggered feedback based subscription mode, in which subscribed information is pushed to the subscriber when the subscribed information changes;
determining, by the device, the corresponding subscription mode for each of the multiple types of subscribed information based on the data stream subscription configuration and the subscription mode configuration included in the subscription configuration; and
sending, by the device, each of the multiple types of subscribed information to the remote attestation server in the corresponding subscription mode, wherein the device is configured to act as a RA client in the trusted computing system,
wherein the subscription mode configuration specifies that at least a first type of the multiple types of subscribed information is to be sent in the periodic feedback-based subscription mode, and that at least a different second type of the multiple types of subscribed information is to be sent in the event-triggered feedback-based subscription mode.

11. The method according to claim 10, wherein the subscription configuration further comprises an event subscription configuration.

12. The method according to claim 11, wherein the sending of subscribed information comprises:
sending, to the remote attestation server based on one or more of the event subscription configuration, a device boot event, a device upgrade event, a specific mode attack event, a master/slave switchover event, a board insertion/removal/switchover event, or a certificate life cycle event.

13. The method according to claim 10, wherein the subscription configuration further comprises a filter configuration, and the subscribed information comprises information obtained after filtering is performed based on the filter configuration.

14. The method according to claim 10, further comprising:
receiving a data processing parameter delivered by the remote attestation server, wherein the subscribed information comprises information obtained after processing is performed based on the data processing parameter.

15. The method according to claim 10, further comprising:
establishing a network configuration protocol session with the remote attestation server, and
receiving, based on the network configuration protocol session, the subscription configuration delivered by the remote attestation server.

16. A remote attestation (RA) server in a trusted computing system, the RA server comprises:
a memory storing executable instructions; and
a processor configured to execute the executable instructions to perform operations comprising:
delivering without using a polling challenge-response mechanism, a subscription configuration to a device acting as an RA client in the trusted computing system, wherein the subscription configuration is for subscribing to information related to remote attestation that to be performed by the RA server to prove whether the device is trusted,
wherein the subscription configuration comprises a data stream subscription configuration specifying multiple types of subscribed information to be sent from the device, the multiple types of subscribed information comprising at least two of:
integrity information of software at each layer of a trust chain, wherein the integrity information of software at each layer of the trust chain is recorded when the device is booted up;
dynamic integrity information of an operating system that is recorded when the device runs;
dynamic integrity information of software that is recorded when the device runs;
an identity certificate related to the device; or
a remote attestation certificate related to the device,
wherein the subscription configuration further comprises a subscription mode configuration that specifies, for each of the multiple types of subscribed information to be sent from the device, a corresponding subscription mode selected from:
a periodic feedback based subscription mode, in which subscribed information is pushed to a subscriber after a specified time period expires; and
an event-triggered feedback based subscription mode, in which subscribed information is pushed to the subscriber when the subscribed information changes; and
receiving each of the multiple types of subscribed information sent by the device in the corresponding subscription mode determined by the device based on the data stream subscription configuration and the subscription mode configuration included in the subscription configuration,
wherein the subscription mode configuration specifies that at least a first type of the multiple types of subscribed information is to be sent in the periodic feedback-based subscription mode, and that at least a different second type of the multiple types of subscribed information is to be sent in the event-triggered feedback-based subscription mode.

17. A device acting as a remote attestation (RA) client in a trusted computing system, the device comprises:
a memory storing executable instructions; and
a processor configured to execute the executable instructions to perform operations comprising:
receiving without using a polling challenge-response mechanism, a subscription configuration delivered by a remote attestation (RA) server in the trusted computing system, wherein the subscription configuration is for subscribing to information related to remote attestation that to be performed by the RA server to prove whether the device is trusted,
wherein the subscription configuration comprises a data stream subscription configuration specifying multiple types of subscribed information to be sent from the device, the multiple types of subscribed information comprising at least two of:
integrity information of software at each layer of a trust chain, wherein the integrity information of software at each layer of the trust chain is recorded when the device is booted up;
dynamic integrity information of an operating system that is recorded when the device runs;
dynamic integrity information of software that is recorded when the device runs;
an identity certificate related to the device; or
a remote attestation certificate related to the device, wherein the subscription configuration further comprises a subscription mode configuration that specifies, for each of the multiple types of subscribed information to be sent from the device, a corresponding subscription mode selected from:

a periodic feedback based subscription mode, in which subscribed information is pushed to a subscriber after a specified time period expires; and an event-triggered feedback based subscription mode, in which subscribed information is pushed to the subscriber when the subscribed information changes;

determining the corresponding subscription mode for each of the multiple types of subscribed information based on the data stream subscription configuration and the subscription mode configuration included in the subscription configuration; and sending each of the multiple types of subscribed information to the remote attestation server in the corresponding subscription mode, wherein the subscription mode configuration specifies that at least a first type of the multiple types of subscribed information is to be sent in the periodic feedback-based subscription mode, and that at least a different second type of the multiple types of subscribed information is to be sent in the event-triggered feedback-based subscription mode.

* * * * *

UNITED STATES PATENT AND TRADEMARK OFFICE
CERTIFICATE OF CORRECTION

PATENT NO. : 12,476,870 B2  
APPLICATION NO. : 17/513841  
DATED : November 18, 2025  
INVENTOR(S) : Liang Xia Page 1 of 1

It is certified that error appears in the above-identified patent and that said Letters Patent is hereby corrected as shown below:

In the Specification

Column 16, Line 7, change "per-trust-evidence" to --pcr-trust-evidence--;

Column 16, Line 17, change "per library" to --pcr library--;

Column 18, Line 38, change "per library: aaa; per indices:" to --pcr library: aaa; pcr indices:--;

Column 20, Line 40, change "per library: aaa; per indices:" to --pcr library: aaa; pcr indices:--;

Column 22, Line 34, change "per library: aaa; per indices:" to --pcr library: aaa; pcr indices:--; and Column 23, Line 14, change "xmins:" to --xml:ns:--.

Signed and Sealed this  
Sixteenth Day of December, 2025

John A. Squires  
*Director of the United States Patent and Trademark Office*